United States Patent
Morimoto

(10) Patent No.: US 9,581,822 B2
(45) Date of Patent: Feb. 28, 2017

(54) HEAD-MOUNTED DISPLAY

(71) Applicant: Sony Corporation, Tokyo (JP)

(72) Inventor: Toshiyasu Morimoto, Kanagawa (JP)

(73) Assignee: Sony Corporation (JP)

( * ) Notice: Subject to any disclaimer, the term of this patent is extended or adjusted under 35 U.S.C. 154(b) by 360 days.

(21) Appl. No.: 13/804,613

(22) Filed: Mar. 14, 2013

(65) Prior Publication Data

US 2013/0249787 A1    Sep. 26, 2013

(30) Foreign Application Priority Data

Mar. 23, 2012 (JP) .................................. 2012-066784

(51) Int. Cl.
*G09G 5/00* (2006.01)
*G02B 27/01* (2006.01)
*G06F 3/01* (2006.01)

(52) U.S. Cl.
CPC ....... *G02B 27/0179* (2013.01); *G02B 27/0172* (2013.01); *G06F 3/012* (2013.01); *G06F 3/017* (2013.01); *G02B 2027/0118* (2013.01); *G02B 2027/0156* (2013.01); *G02B 2027/0187* (2013.01)

(58) Field of Classification Search
CPC ... G02B 27/01; G02B 27/017; G02B 27/0179; G02B 2027/0123; G02B 2027/0132; G02B 2027/0154; G02B 2027/0178; G02B 2027/0181; G02B 2027/0187; G06F 3/011; G06F 3/012; G06F 3/013
See application file for complete search history.

(56) References Cited

U.S. PATENT DOCUMENTS

| | | | |
|---|---|---|---|
| 4,651,201 A * | 3/1987 | Schoolman | A61B 1/00048 348/45 |
| 4,679,255 A * | 7/1987 | Kuhlman | A61F 9/061 2/8.3 |
| 5,281,957 A * | 1/1994 | Schoolman | G02B 27/2228 345/8 |
| 8,203,502 B1 * | 6/2012 | Chi et al. | 345/7 |
| 9,164,588 B1 * | 10/2015 | Johnson | G06F 3/017 |
| 2002/0149545 A1 * | 10/2002 | Hanayama | G02B 27/017 345/7 |
| 2006/0119539 A1 * | 6/2006 | Kato | G02B 27/0176 345/8 |
| 2007/0273983 A1 * | 11/2007 | Hebert | 359/708 |
| 2010/0315329 A1 * | 12/2010 | Previc | G06F 3/012 345/156 |
| 2012/0068914 A1 * | 3/2012 | Jacobsen | G06F 1/163 345/8 |
| 2012/0236025 A1 * | 9/2012 | Jacobsen | G06F 3/011 345/629 |

FOREIGN PATENT DOCUMENTS

JP    2011-145488 A    7/2011

* cited by examiner

*Primary Examiner* — Ilana Spar
*Assistant Examiner* — Kirk Hermann
(74) *Attorney, Agent, or Firm* — Lerner, David, Littenberg, Krumholz & Mentlik, LLP

(57) ABSTRACT

According to an illustrative embodiment, a head-mounted display is provided. The head-mounted display includes a casing having an opening portion; and a movable member movable between a first position in which the movable member covers the opening portion, and a second position in which the movable member does not cover the opening portion.

7 Claims, 16 Drawing Sheets

HEAD-MOUNTED DISPLAY

CROSS-REFERENCE TO RELATED APPLICATION

The present application claims priority from Japanese Patent Application JP 2012-066784, filed in the Japanese Patent Office on Mar. 23, 2012, the entire content of which is hereby incorporated by reference herein.

BACKGROUND

The present technology relates to a head-mounted display that can be used for medical purposes.

A head-mounted display (HMD) that the wearer puts on the head for, for example, viewing images is known. For example, as one of the HMDs, there is known an HMD including image display surfaces and display elements for right and left eyes (see, Japanese Patent Application Laid-open No. 2011-145488). The HMD having such a configuration can display images having a parallax to the left and right eyes of the wearer through the left and right display surfaces, and hence can present three-dimensional (3D) images without crosstalk.

Meanwhile, also in an endoscope apparatus and the like used for medical purposes, a practical use of a 3D endoscope apparatus that can present 3D images is in consideration. An endoscopic surgery is less invasive for patients than a general surgical operation, and hence is popular in recent years. However, an affected part(s) is checked only by images during a surgery, and hence it is sometimes difficult to perceive a depth with traditional two-dimensional (2D) images. Therefore, it is expected that connecting and using the HMD capable of providing 3D images to a 3D endoscope apparatus can realize a more correct and rapid endoscopic surgery while viewing realistic images of the affected part.

SUMMARY

Here, in general, a peripheral vision of the wearer wearing the HMD is limited. Therefore, for example, in order to perform a treatment other than an endoscopic operation during a surgery or to communicate with another doctor, it is sometimes necessary for a doctor to put off the HMD. However, it is difficult for the wearer being the doctor to put on/off the HMD according to his or her intention due to hand antisepsis during the surgery.

In view of the above-mentioned circumstances, there is a need for providing a head-mounted display that is capable of ensuring a peripheral vision even in a state in which a wearer wears the head-mounted display.

As described above, according to the embodiments of the present technology, it is possible to provide a head-mounted display that is capable of ensuring a peripheral vision even in a state in which a wearer wears the head-mounted display.

According to an illustrative embodiment, a head-mounted display includes a casing having an opening portion; and a movable member movable between a first position in which the movable member covers the opening portion, and a second position in which the movable member does not cover the opening portion.

These and other objects, features and advantages of the present disclosure will become more apparent in light of the following detailed description of best mode embodiments thereof, as illustrated in the accompanying drawings.

DETAILED DESCRIPTION OF EMBODIMENTS

Hereinafter, embodiments according to the present technology will be described with reference to the drawings.

First Embodiment

Endoscopic System

Figure 1:
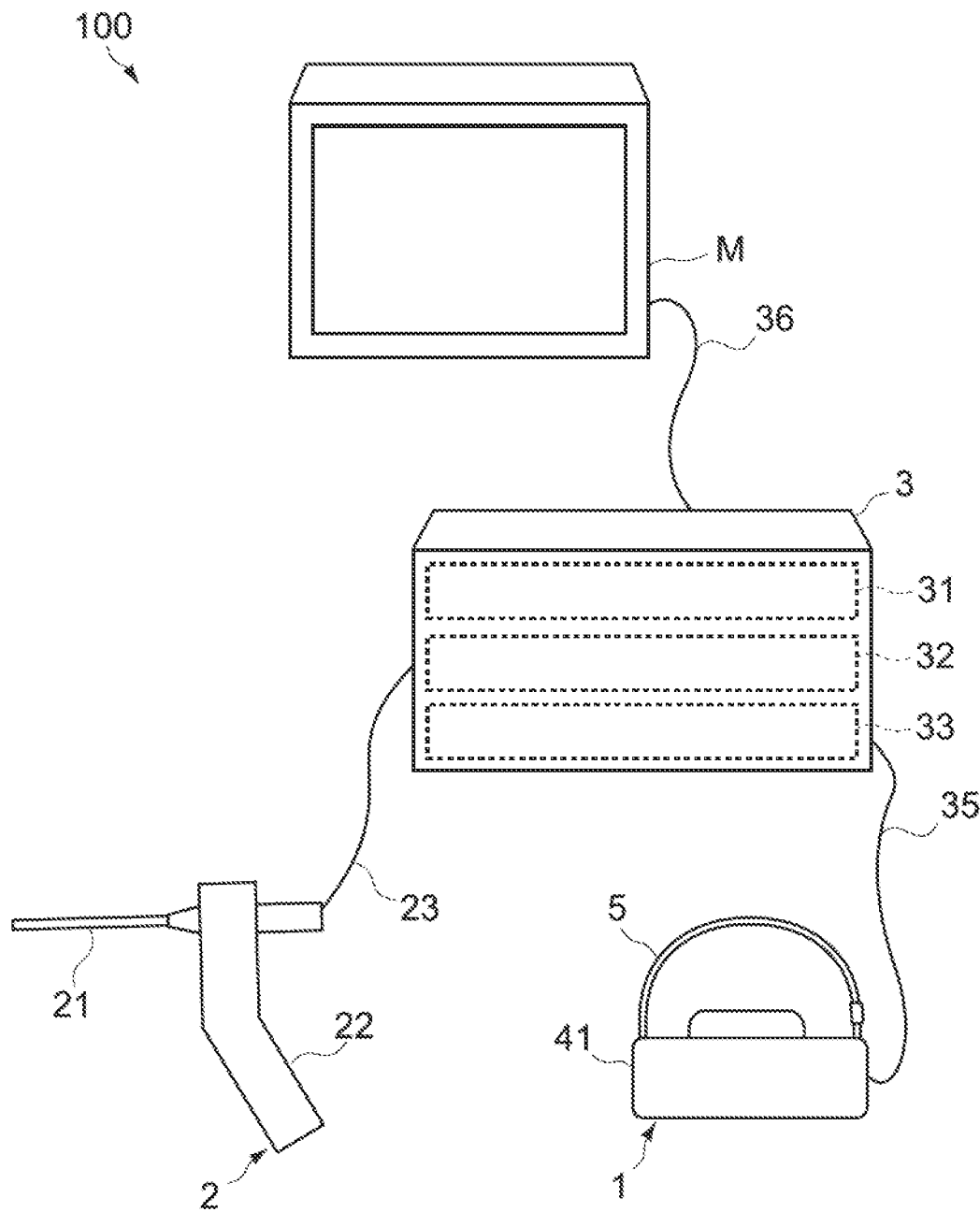
FIG. 1 is a view schematically showing a configuration example of an endoscopic system according to a first embodiment of the present technology.

FIG. 1 is a view schematically showing a configuration example of an endoscopic system according to an embodiment of the present technology. An endoscopic system 100 according to this embodiment includes a head-mounted display (HMD) 1, an endoscope apparatus 2, and a processor unit 3. The endoscopic system 100 according to this embodiment presents an image of an affected part(s), which is captured by the endoscope apparatus 2, to the wearer of the HMD 1. At this time, typically, the wearer wears the HMD 1 and a surgery assistant or the like operates the endoscope apparatus 2. That is, a doctor being the wearer of the HMD 1 gives instructions to the surgery assistant or the like while observing a state of the affected part by the image of the HMD 1 in order to perform an appropriate treatment on the affected part. Note that, the surgery assistant or the like may also wear the HMD 1 depending on the situation.

The endoscope apparatus 2 includes, for example, an insertion portion 21 and an operation portion 22. The insertion portion 21 has a tubular shape that can be inserted into a body. The insertion portion 21 includes therein an image sensor such as a CMOS (complementary metal-oxide semiconductor) image sensor and an optical system such as a lens for imaging an affected part(s), which are not shown in the figure. Further, in this embodiment, two image sensors, two optical systems, and the like are provided for capturing right eye and left eye images having a parallax. With this, 3D image data for stereoscopically displaying the affected part can be acquired.

In addition, for example, a knife or forceps for resecting or holding the affected part is/are inserted into the insertion portion 21. The operation portion 22 is configured to perform an operation on the insertion portion 21 and the like while gripped by the surgery assistant or the like. Further, the operation portion 22 is connected to the processor unit 3 via a cable 23.

The processor unit 3 includes, for example, an image processing unit 31, a light source 32, and a converter 33. For example, the image processing unit 31 serves to process images acquired by the endoscope apparatus 2. The light source 32 serves to irradiate the affected part with light upon imaging by the endoscope apparatus 2. The converter 33 serves to perform conversion processing on signals relating to images to be outputted to the HMD 1. The light emitted from the light source 32 is guided to a distal end of the insertion portion 21 via, for example, light guide fibers provided inside the insertion portion 21.

Further, in the image processing unit 31, the right eye and left eye images captured can be overlapped and processed as the 3D image data. The 3D image data is outputted to a monitor apparatus M via, for example, a cable 36, which allows a person other than the wearer wearing the HMD 1 to also check the affected part during the surgery.

The HMD 1 is electrically connected to the processor unit 3 and worn by the doctor who gives instructions while observing endoscopic images or the surgery assistant or the like who operates the endoscope apparatus 2 according to the instructions. The connection method for the HMD 1 and the processor unit 3 is not particularly limited and a wired connection or a wireless connection may be used. In this embodiment, for example, the wired connection is used. Specifically, the HMD 1 and the processor unit 3 are connected to each other via a cable 35 outputted and inputted from/to HDMI (high-definition multimedia interface) terminals.

The signals relating to the right eye and left eye images captured by the endoscope apparatus 2 are processed as image signals by the image processing unit 31. After that, the image signals are each processed by the converter 33 as image data adapted for the HMD 1, and outputted to the HMD 1 via the cable 35. Note that, the processor unit 3 may be configured to supply the HMD 1 with a driving electrical power via the cable 35.

Note that, the converter 33 that processes output signals to the HMD 1 is not limited to the example shown in the figure in which the converter 33 is housed in a single casing together with the image processing unit 31 and the like. The converter 33 may be housed in a separate casing other than that for the image processing unit 31 and the like.

Next, a detailed configuration of the HMD 1 according to this embodiment will be described.

[HMD]

Figure 2:
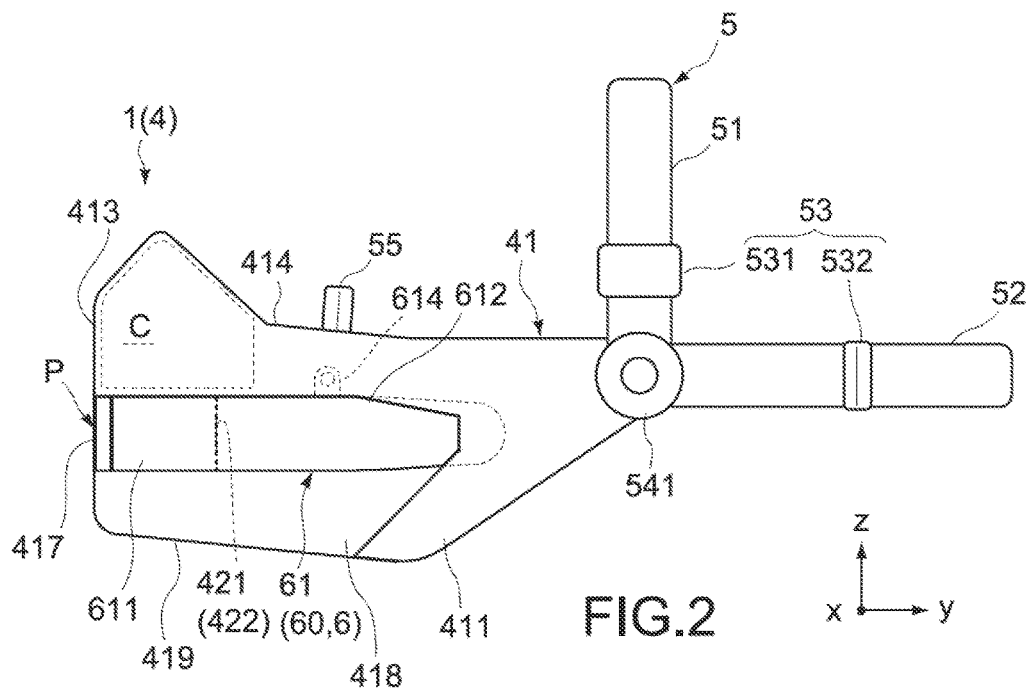
FIG. 2 is a schematic side view showing a head-mounted display according to the first embodiment of the present technology with a movable member being at a first position.
Figure 3:
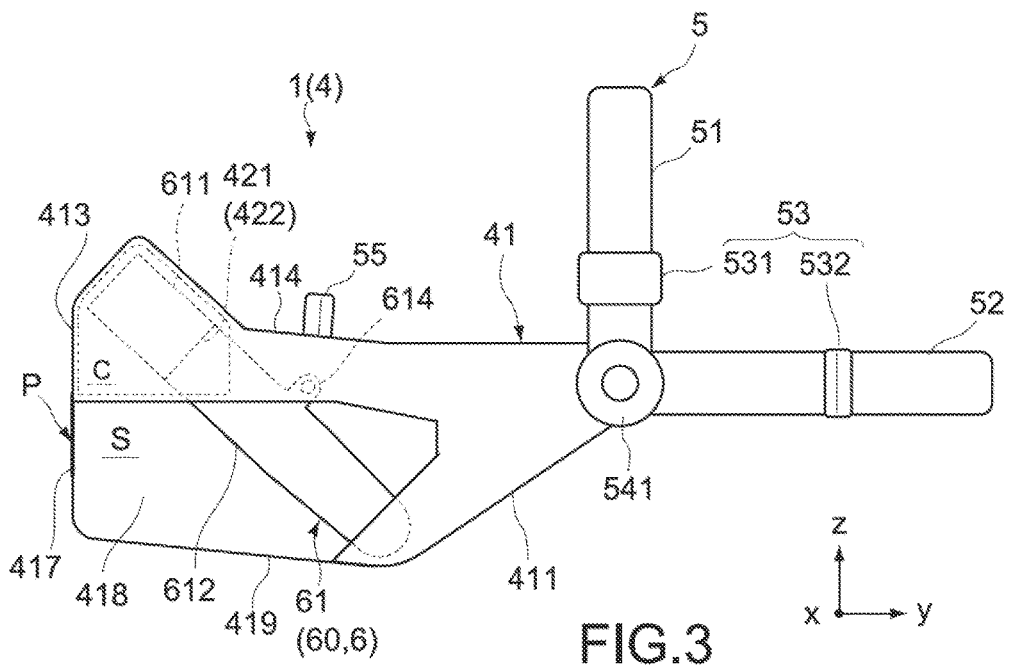
FIG. 3 is a schematic side view showing the head-mounted display according to the first embodiment of the present technology with the movable member being at a second position.
Figure 4:
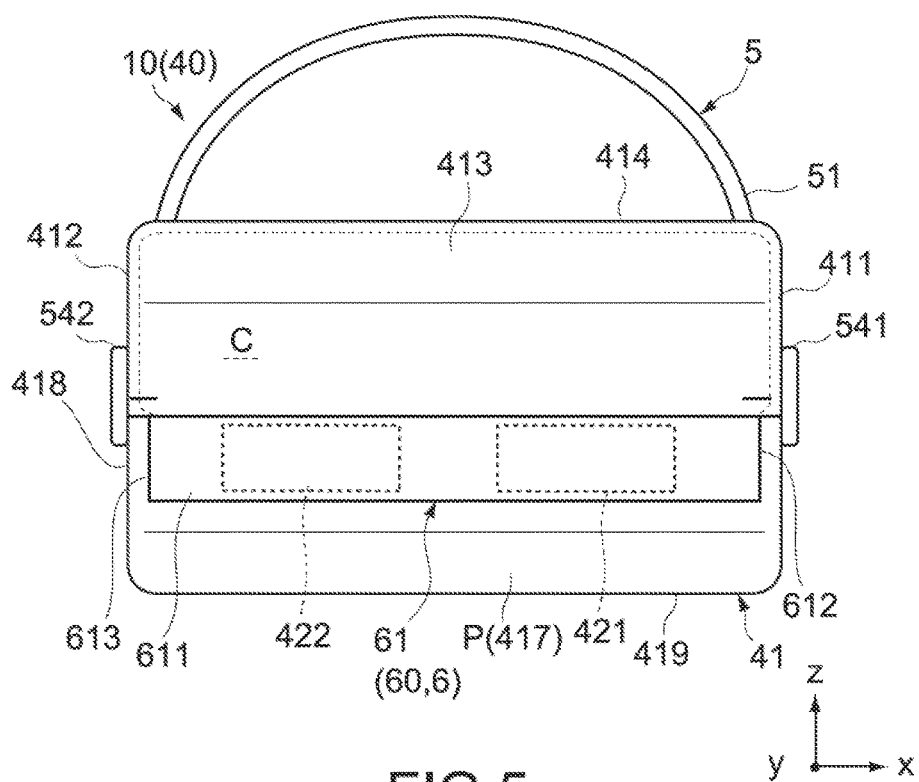
FIG. 4 is a schematic front view showing the head-mounted display according to the first embodiment of the present technology with the movable member being at the first position.
Figure 5:
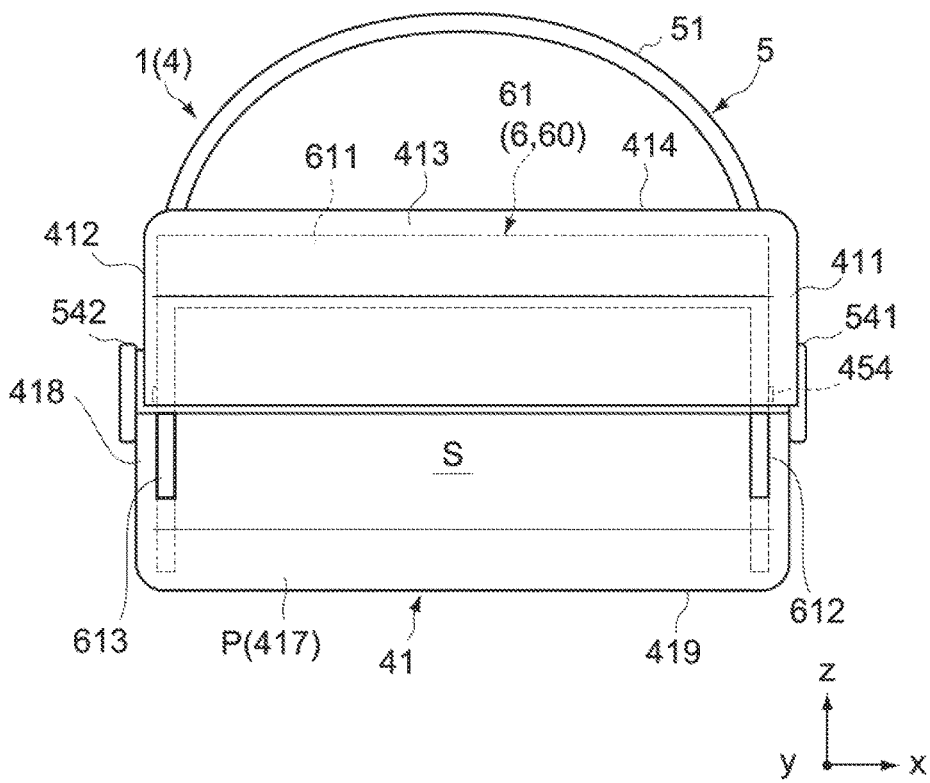
FIG. 5 is a schematic front view showing the head-mounted display according to the first embodiment of the present technology with the movable member being at the second position.
Figure 6:
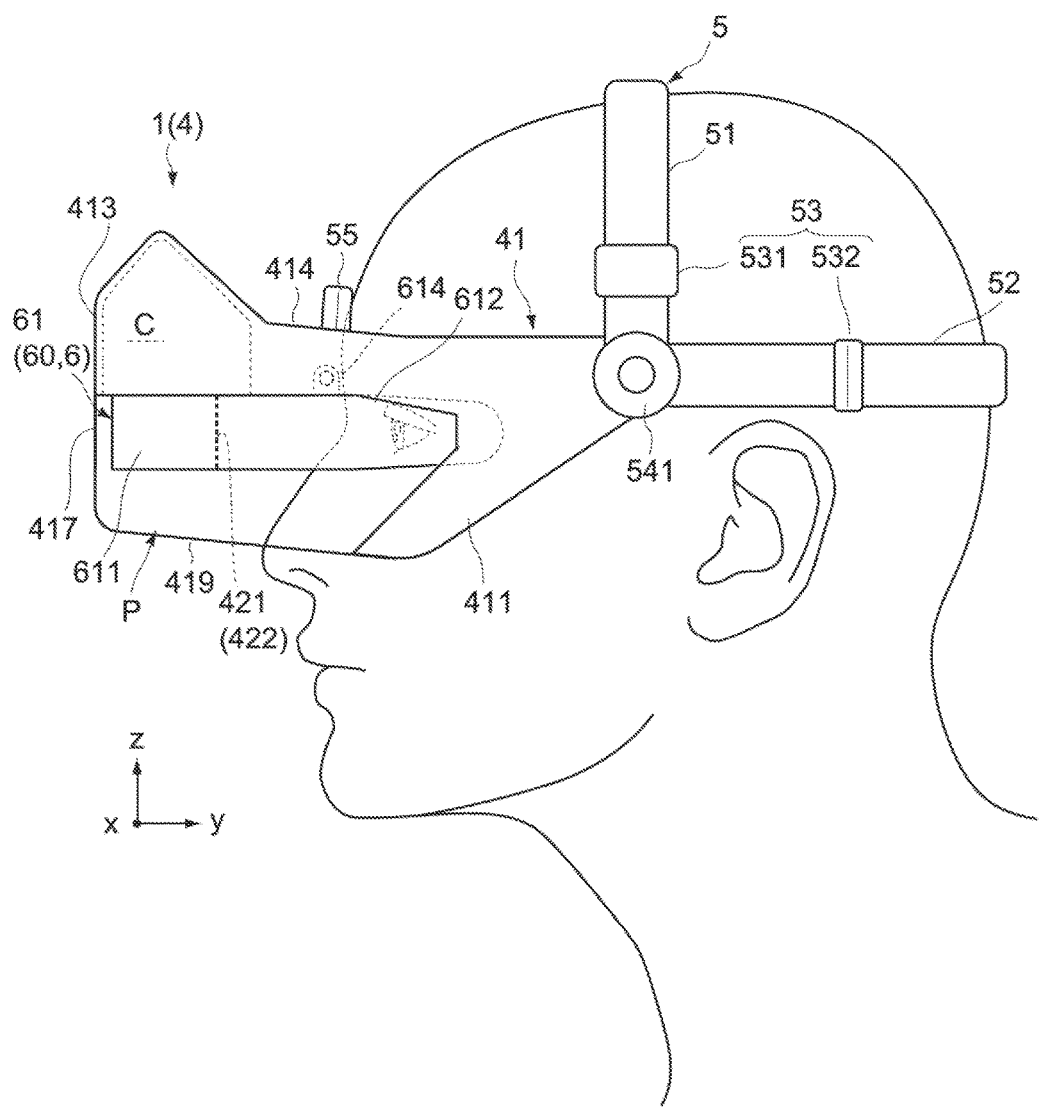
FIG. 6 is a schematic side view showing a state in which a wearer wears the head-mounted display according to the first embodiment of the present technology with the head-mounted display being in a first state.
Figure 7:
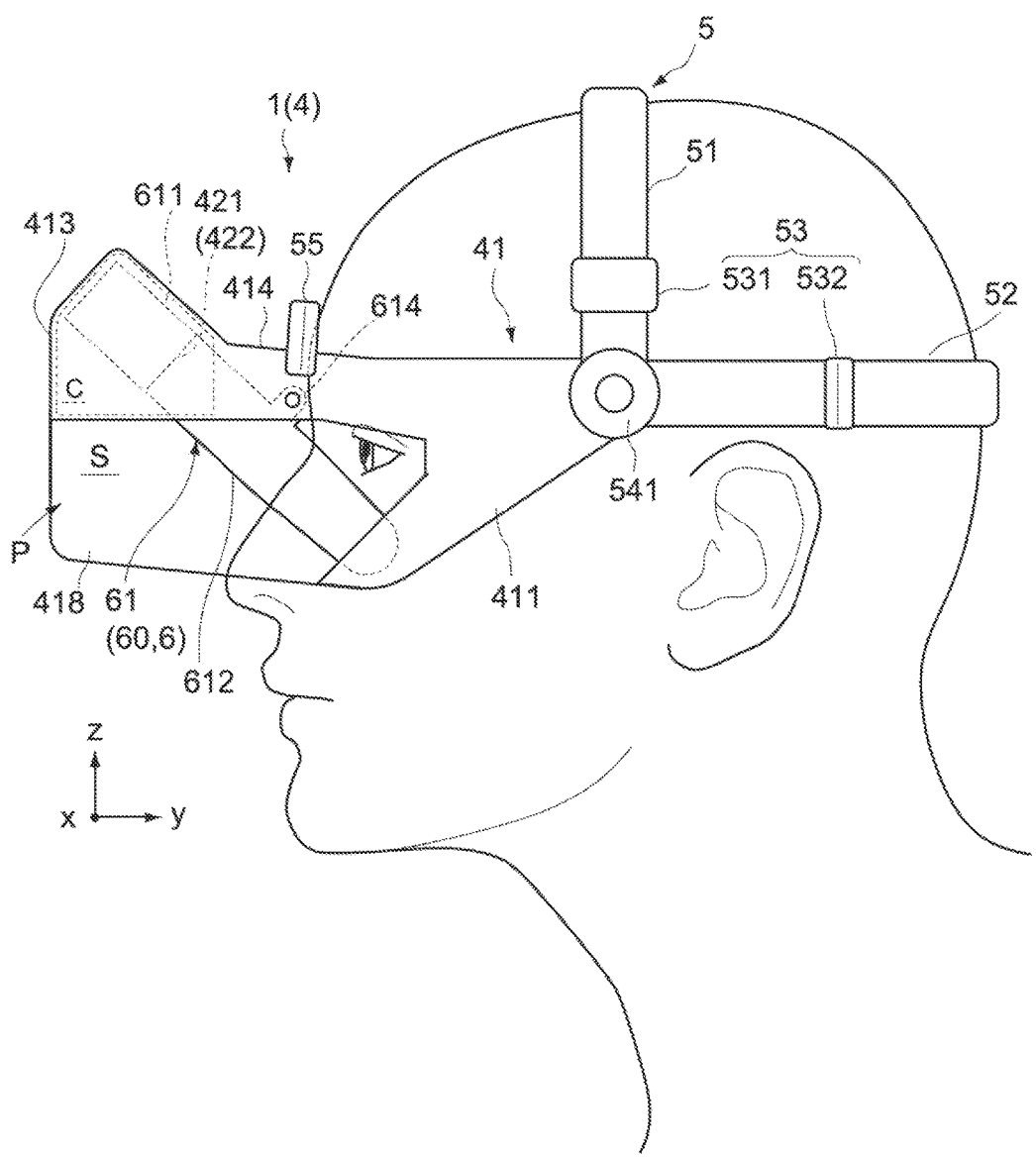
FIG. 7 is a schematic side view showing a state in which the wearer wears the head-mounted display according to the first embodiment of the present technology with the head-mounted display being in a second state.
Figure 8:
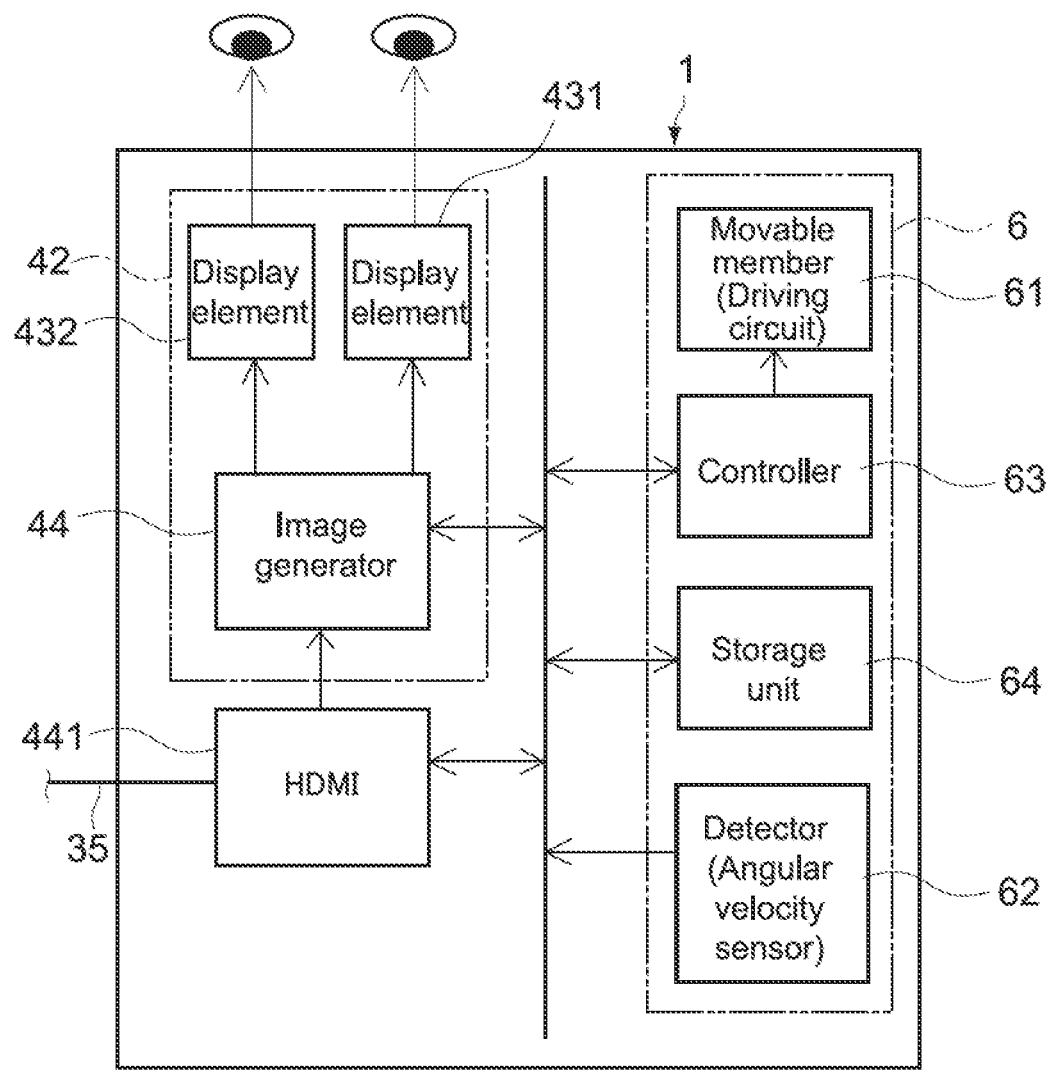
FIG. 8 is a block diagram showing a configuration of the head-mounted display according to the first embodiment of the present technology.

FIGS. 2 to 8 are views each showing the configuration of the HMD 1 according to this embodiment. FIGS. 2 and 3 are schematic side views. FIGS. 4 and 5 are schematic front views. FIGS. 6 and 7 are schematic side views each showing a state in which the wearer wears the HMD 1. FIG. 8 is a block diagram showing a configuration of an image display unit. The HMD 1 includes a main body 4 and a switching portion 6. The HMD 1 according to this embodiment is formed of, for example, a goggle-shaped non-see-through HMD.

Note that, an x-axis direction and a y-axis direction in the figures each indicate a horizontal direction in an xyz coordinate system to which the HMD 1 belongs. The x-axis direction (second axis direction) corresponds to left and right directions of the main body 4. The y-axis direction (first axis direction) corresponds to front and rear directions of the main body 4, which are orthogonal to the x-axis direction. A z-axis direction indicates a direction orthogonal to the x-axis direction and the y-axis direction and corresponds to upper and lower directions of the main body 4.

Further, an X-axis direction and a Y-axis direction in the figures each indicate a horizontal direction in an XYZ coordinate system to which the wearer belongs, and an XY plane indicates a "horizontal plane." That is, the X-axis direction indicates left and right directions as viewed from the wearer and the Y-axis direction is orthogonal to the X-axis direction and indicates front and rear directions as viewed from the wearer (front and back directions of the wearer). A Z-axis direction is orthogonal to the X-axis direction and the Y-axis direction and indicates a vertical direction.

First, a schematic configuration of the HMD 1 according to this embodiment will be described. In this embodiment, the casing 41 of the main body 4 includes opening portions (first opening portion, second opening portions, and third opening portion) 417, 418, and 419. In the casing 41, an inner space S formed inside the opening portions 417 and 418. The space S is configured to be capable of housing a movable member (first movable member) 61 included in an opening and closing mechanism 60 of the switching portion 6. The movable member 61 is configured as an image display apparatus of the HMD 1. The movable member 61 supports display surfaces 421 and 422 for displaying an image to the eyes of the wearer. The display surfaces 421 and 422 are configured to present an image to the wearer in a state in which the movable member 61 is housed in the space S (first state).

Hereinafter, configurations of the respective components will be described.

(Main Body)

The main body 4 includes the casing 41, the display surfaces 421 and 422, and a mounting portion 5. In this embodiment, the main body 4 further includes an image display unit 42 that generates images to be displayed by the display surfaces 421 and 422. The main body 4 is configured so that, when the mounting portion 5 is mounted on the head of the wearer, the casing 41 is located in front of the left and right eyes of the wearer.

The casing 41 is, as a whole, configured to fit the face, covering the left and right eyes of the wearer. The casing 41 includes a left side surface (first side surface) 411 and a right side surface (second side surface) 412 that are opposed to each other in the x-axis direction, a front surface 413, and an upper surface 414.

In addition, the casing 41 includes the opening portion (first opening portion) 417, the opening portions (second opening portions) 418, and the opening portion (third opening portion) 419. In this embodiment, the opening portions 417, 418, and 419 are continuously provided in a lower part of the left and right side surfaces 411 and 412 and the front surface 413 of the casing 41. A light-transmitting surface P is provided to wholly cover the opening portions 417, 418, and 419.

The opening portion 417 is formed in an area of the light-transmitting surface P, which corresponds to the lower part of the front surface 413. Through the opening portion 417, the wearer can be provided with a field of view before (in front of) the wearer. The opening portions 418 are formed in areas of the light-transmitting surface P, which are opposed to each other in the x-axis direction. Through the opening portions 418, the wearer can be provided with field of views on the sides of the wearer. Further, the opening portion 419 is formed in an area of the light-transmitting surface P, which is opposed to the upper surface 414 in the z-axis direction and corresponds to a lower surface of the light-transmitting surface P. Through the opening portion 419, the wearer can be provided with a field of view under the eyes of the wearer.

The material of the light-transmitting surface P is not particularly limited as long as it has a see-through property. For example, the light-transmitting surface P is formed of a light-transmitting plastic plate, a light-transmitting glass plate, or the like.

The casing 41 has the space S formed inside the light-transmitting surface P in a depth direction. The space S is configured to be capable of housing the movable member 61, which will be described later. In addition, in an inner area surrounded by the upper surface 414, the left and right side surfaces 411 and 412, and the front surface 413, a housing area C is formed. The housing area C is configured to be capable of housing a part of the movable member 61.

The display surfaces 421 and 422 are arranged on the movable member 61 along the x-axis direction to be capable of displaying the images for the left and right eyes of the wearer to the eyes, respectively. The shape and size of the display surfaces 421 and 422 are not particularly limited. In this embodiment, each of the display surfaces 421 and 422 has a rectangular shape with about 16 mm in the vertical direction and about 30 mm in the horizontal direction. The material of the display surfaces 421 and 422 is not particularly limited as long as it has a see-through property. For example, a plastic plate, a glass plate, or the like is used as the material of the display surfaces 421 and 422.

Referring to FIG. 8, the image display unit 42 includes an image generator 44 and left and right display elements 431 and 432. The image display unit 42 is, as a whole, provided to the movable member 61 to present an image captured by the endoscope apparatus 2 to the wearer.

Specifically, the image generator 44 first generates, based on image data acquired via the processor unit 3, image signals to be outputted to the left and right display elements 431 and 432, respectively. Then, the display elements 431 and 432 emit image light beams corresponding to those image signals to the display surfaces 421 and 422, respectively, so that images are presented to the wearer.

In this embodiment, the image generator 44 includes an image data conversion circuit or the like that converts the right eye and left eye image data sent from the processor unit 3 into the image signals for the HMD 1. The image generator 44 acquires endoscopic image data from an HDMI input terminal 441 connected to the cable 35.

In addition, the image generator 44 may perform predetermined offset processing or the like on the image data to generate left-eye and right-eye image signals suitable for the HMD 1. With this, it is possible to present a desired 3D image to the wearer. The amount of offset in the offset processing is calculated based on, for example, distances between eyes and the display elements 431 and 432 of the HMD 1, a distance between both eyes, or a virtual image position, which will be described later.

The image generator 44 outputs the generated left-eye and right-eye image data to the left and right display elements 431 and 432, respectively.

The left and right display elements 431 and 432 output, based on the image data inputted from the image generator 44, the image light beams to the left and right display surfaces 421 and 422. The display elements 431 and 432 are arranged to be respectively opposed to the display surfaces 421 and 422 in the y-axis direction, for example. With this, the optical axes of the image light beams, which are outputted from the display elements 431 and 432 and the display surfaces 421 and 422, become parallel to the y-axis direction.

In this embodiment, the display elements 431 and 432 are formed of organic EL (electroluminescence) elements. The use of the organic EL elements as the display elements 431 and 432 can achieve downsizing, high contrast, a rapid response, and the like.

As the display elements 431 and 432, for example, a plurality of red organic EL elements, green organic EL elements, blue organic EL elements, and the like are arranged in a matrix form. By being driven by a driving circuit of active matrix type, simple (passive) matrix type, or the like, these elements emit light by themselves at a predetermined timing with a predetermined luminance and the like. Further, the display elements 431 and 432 are configured to display a predetermined image by the driving circuit being controlled according to the image signals generated by the image generator 44.

Note that, the display elements 431 and 432 are not limited to the above-mentioned configuration. For example, a liquid crystal display (LCD) and the like may be used.

Between the display elements 431 and 432 and the display surfaces 421 and 422, for example, a plurality of eye lenses (not shown) are provided as optical systems. By causing these eye lenses and the eyes of the wearer to be opposed to each other with a predetermined distance therebetween, it is possible for the wearer to observe a virtual image as if the virtual image is displayed at a predetermined position (virtual image position). The virtual image position and the size of the virtual image are set depending on the configurations of the display elements 431 and 432 and the optical systems and the like. For example, the size of the virtual image is 750 inches adapted for a movie size and the virtual image position is set to be located at a position away from the wearer by about 20 m.

Here, in order to allow the wearer to observe the virtual image, when the movable member 61 is located at a first position, the casing 41 is positioned with respect to the wearer so that the image light beams outputted from the display elements 431 and 432, with the y-axis direction being an optical direction thereof, form images respectively on the irises of the left and right eyes through the eye lenses and the like.

Therefore, in order to allow the wearer to observe the predetermined image, when the movable member 61 is located at the first position, it is necessary to position the casing 41 so that the display surfaces 421 and 422 and the left and right eyes (pupils) of the wearer are opposed to each other in the y-axis direction. Hereinafter, such a relative position of the casing 41 to the wearer is referred to as a "suitable relative position."

When the casing 41 is not located at the suitable relative position, an out-of-focus image or a blurred 3D image is generated and the wearer cannot view a desired image. Therefore, upon the mounting of the HMD 1, it is necessary to adjust the casing 41 to be located at the suitable relative position. Further, during the mounting, it is necessary to fix the casing 41 to the head to prevent this position from changing. In this embodiment, the relative position of the casing 41 is adjusted and fixed by the mounting portion 5, which will be described in the following.

The mounting portion 5 includes bands 51 and 52, an adjuster 53, left and right attachment members 541 and 542, and a forehead pad 55. The mounting portion 5 is provided to the casing 41 to be mountable on the head of the wearer so that the HMD 1 is located at the suitable relative position to the wearer, that is, the display surfaces 421 and 422 and the left and right eyes of the wearer are opposed to each other in the y-axis direction.

Referring to FIGS. 6 and 7, a schematic configuration of the mounting portion 5 according to this embodiment will be described. The bands 51 and 52 are attached via the casing 41 and the attachment members 541 and 542. The bands 51 and 52 each extend, for example, from the left side surface 411 of the casing 41 through the parietal region or the occipital region of the wearer to the right side surface 412. In addition, the adjuster 53 is configured to be capable of adjusting the length of the bands 51 and 52, and hence the relative position of the casing 41 to the wearer in a height direction and the front and rear directions can be adjusted. Further, the forehead pad 55 is configured to be able to abut against the forehead of the wearer. By adjusting the length of the band 52 passing through the occipital region, it is possible to fix the relative position in the front and rear directions of the wearer through the forehead pad 55 and the band 52.

The bands 51 and 52 both include, for example, two short bands to be attached to the attachment members 541 and 542. The bands 51 and 52 are configured to become a single band as a whole by these short bands being overlapped with each other by a predetermined length and fixed. The adjuster 53, which will be described later, is used for the fixing. Further, for the material of the bands 51 and 52, for example, a rubber, plastic, cloth, or the like is used in view of strength and flexibility thereof.

In this embodiment, the adjuster 53 adjusts the relative position of the casing 41 to the wearer. The adjuster 53 is attached to, for example, each of the bands 51 and 52 and includes adjustment members 531 and 532 capable of adjusting the length of the bands 51 and 52 from the attachment member 541 to the attachment member 542.

For each of the adjustment members 531 and 532, for example, a configuration of a buckle or a latch used for a belt or the like may be used. With this configuration, it is possible to arbitrarily fix and change the overlapping length of the respective two short bands of the bands 51 and 52, and the length of the bands 51 and 52 can be changed. The configurations of the adjustment members 531 and 532 are not particularly limited, and may be appropriately selected depending on the material, shape, and the like of the bands 51 and 52.

In this embodiment, the left and right attachment members 541 and 542 are provided to the left and right side surfaces 411 and 412, respectively. The configurations of the attachment members 541 and 542 are not particularly limited. For example, a swaging configuration in which the bands 51 and 52 are, at one ends thereof, overlapped with each other and attached to the casing 41 may be used. Further, the attachment members 541 and 542 may be configured so that the bands 51 and 52 are each rotatable with respect to the casing 41 within a predetermined angle range.

The forehead pad 55 is provided to the casing 41 to protrude above the upper surface 414, for example. The configuration of the forehead pad 55 is not particularly limited and a cushion configuration is used for a surface to abut against the wearer in view of a wearing comfort of the wearer and the like. Further, if necessary, the angle with respect to the casing 41 and the height position of the forehead pad 55 in the z-axis direction may be configured to be adjustable. In addition, if necessary, the forehead pad 55 may be configured to be detachable.

(Switching Portion)

The switching portion 6 includes the opening and closing mechanism 60, a detector 62, a controller 63, and a storage unit 64. The switching portion 6 is provided to the main body 4 to switch between a first state (image display mode) in which the display surfaces 421 and 422 presents an image to the wearer and a second state (peripheral-vision-ensuring mode) in which the wearer is provided with a field of view outside the casing 41.

The opening and closing mechanism 60 is configured to be capable of opening and closing the opening portion 417. In this embodiment, the opening and closing mechanism 60 includes the movable member (first movable member) 61. The movable member 61 is configured to be movable between a first position for closing the opening portions 417 and 418 and a second position for opening the opening portions 417 and 418. In addition, the movable member 61 is configured to present an image to the wearer at the first position at which the opening portion 417 is closed.

The movable member 61 includes a movable casing (first area) 611 and movable plates (second areas) 612 and 613.

The movable casing 611 supports the display surfaces 421 and 422. Inside the movable casing 611, the image generator 44 of the image display unit 42 and the left and right display elements 431 and 432 are provided. With this, the movable casing 611 is, as a whole, configured as the image display apparatus. The movable plates 612 and 613 are configured to be opposed to each other in the x-axis direction. The movable plates 612 and 613 are provided to be continuous with the left and right side surfaces of the movable casing 611, respectively.

In the image display mode, the movable member 61 is located at the first position to be housed in the space S. That is, the movable casing 611 closes the opening portion 417 and the movable plates 612 and 613 close the opening portions 418. Further, in the image display mode, the display surfaces 421 and 422 are configured to emit the image light in the y-axis direction as described above. At this time, the opening portions 417 and 418 provided in the front surface and the side surfaces of the light-transmitting surface P are closed. Therefore, it is possible to suppress incident light from the outside. Thus, a clearer image can be provided to the wearer.

In the peripheral-vision-ensuring mode, the movable member 61 is located at the second position at which the movable casing 611 is housed in the housing area C. That is, the opening portions 417 and 418 are opened. With this, it is possible to ensure the field of view in front of and on the left- and right-hand sides of the wearer via the space S and the light-transmitting surface P.

The movable member 61 includes a movable shaft 614 provided to be capable of rotating the movable plates 612 and 613 with respect to the casing 41. The movable shaft 614 extends in the x-axis direction. With this, the movable member 61 can be configured to be movable between the first position and the second position, rotating about the movable shaft 614 (x-axis). Specifically, the movable member 61 is configured to rotate upward in the vertical direction about the x-axis from the first position to be housed in the space S to move the second position to be housed in the housing area C.

A driving source of the movable member 61 is not particularly limited. For example, an electric motor may be used. Further, the detector 62 and the controller 63, which will be described in the following, control the switching between the positions via a driving circuit of the movable member 61.

The detector 62 is provided to the main body 4 to be capable of acquiring information on the motion of the wearer. The detector 62 allows the wearer to perform the switching between the positions of the movable member 61 according to the intention of the wearer without touching the movable member 61.

In this embodiment, the detector 62 is formed of an angular velocity sensor 62. The angular velocity sensor 62 is typically a gyro sensor and is provided to the casing 41. The angular velocity sensor 62 outputs, to the controller 63, a signal relating to angular velocity due to the rotation of the casing 41 about the x-axis, which corresponds to the motion of the head of the wearer. Although, for example, a vibration type gyro sensor or the like is used as the angular velocity sensor 62, the angular velocity sensor 62 is not particularly limited thereto.

For example, when the wearer makes a motion of moving the head upward or a motion of moving the head downward in a state in which the wearer wears the HMD 1, the angular velocity sensor 62 is capable of outputting such a motion as the signal relating to the angular velocity of the casing 41 about the x-axis.

The controller 63 controls the switching between the first state and the second state according to the signal relating to the angular velocity, which is outputted from the detector 62.

The controller 63 is typically formed of an MPU (microprocessing unit) or the like. The controller 63 performs predetermined arithmetic processing according to a program stored in the storage unit 64 and makes a predetermined determination based on the processing result. In addition, based on the determination result, the controller 63 controls the driving source of the movable member 61 to be driven.

The controller 63 first calculates the angular velocity due to the rotation of the casing 41 about the x-axis according to the signal outputted from the angular velocity sensor 62. In addition, the controller 63 determines whether or not the angular velocity is equal to or larger than predetermined angular velocity. When the angular velocity is equal to or larger than the predetermined angular velocity, the controller 63 integrates the angular velocity by a predetermined period of time, to thereby calculate an angle of rotation in the predetermined period of time. Here, regarding the "predetermined period of time," it is assumed that a time when the angular velocity becomes equal to or larger than the predetermined value is a start point and a time when the angular velocity becomes smaller than the predetermined value is an end point.

Next, the controller 63 determines whether or not the angle of rotation is equal to or larger than a predetermined angle. When the angle of rotation is equal to or larger than the predetermined angle, the controller 63 outputs a driving signal to the driving circuit of the movable member 61. With this, the switching between the first position and the second position of the movable member 61 can be performed when the rotation of the casing 41 about the x-axis is at the predetermined velocity or higher and the predetermined angle or more.

In addition, the controller 63 may be configured to determine a direction of the rotation. For example, when such angular velocity that the front surface 413 side of the casing 41 rotates upward about the x-axis is detected, the controller 63 may be configured to output a signal for moving the movable member 61 from the first position to the second position. Meanwhile, when such angular velocity that the front surface 413 rotates downward about the x-axis is detected, the controller 63 may be configured to output a signal for moving the movable member 61 from the second position to the first position.

For example, when the wearer performs the motion of moving the head upward with the movable member 61 being at the first position, the movable member 61 correspondingly moves upward to the second position. Meanwhile, when the wearer performs the motion of moving the head downward with the movable member 61 being at the second position, the movable member 61 correspondingly moves downward to the first position. The detector 62 and the controller 63 having the above-mentioned configurations are capable of giving instructions according to the intuition of the wearer to the movable member 61.

Note that, the activation method for the angular velocity sensor 62 is not particularly limited. For example, a switch or the like for activating the angular velocity sensor 62 may be provided to the casing 41, the processor unit 3, or the like. Further, the angular velocity sensor 62 may be activated in synchronization with the activation of the HMD 1.

The storage unit 64 includes a RAM (random access memory), a ROM (read only memory), another semiconductor memory, and the like. The storage unit 64 stores a program and the like used for various arithmetic operations by the controller 63. For example, the ROM is formed of a non-volatile memory and stores a program and a setting value for causing the controller 63 to execute arithmetic processing such as calculation of the angle of the tilt. Further, the storage unit 64 is enabled by, for example, a non-volatile semiconductor memory to store a program and the like for determining whether the head-mounted display is in the first state, the second state, or the like. In addition, those programs stored in the semiconductor memory and the like in advance may be loaded into the RAM and executed by the controller 63.

Alternatively, the storage unit 64 may be configured to store determination results after the activation of the HMD 1 in order to grasp a current position of the movable member 61. With this, for example, when the controller 63 determines the direction of the rotation of the casing 41, it is possible to control the movement of the movable member 61 in view of the current position of the movable member 61.

With the thus configured HMD 1, it is possible to move the movable member 61 according to the motion of the head of the wearer. That is, the switching between the image display mode in which an image is presented and the peripheral-vision-ensuring mode in which the wearer is provided with the outside field of view can be performed according to the intention of the wearer without touching the HMD 1. Therefore, for example, even in the situation where the wearer cannot directly touch the HMD 1 due to hand antisepsis, it is possible to provide the peripheral vision in a hands-free fashion.

Further, the opening portion 419 for providing the field of view under the eyes of the wearer is formed in the casing 41 of the HMD 1 according to this embodiment, and hence a field of view near the hands can be ensured even in the image display mode. With this, it is possible to perform a treatment and the like near the hands other than the treatment using the endoscope. Thus, the HMD 1 can be configured to be applicable to more diverse situations.

In addition, with the angular velocity sensor 62, it is possible to detect the upward or downward motion of the head of the wearer and correspondingly switch between the image display mode and the peripheral-vision-ensuring mode. With this, the movement of the movable member 61 and the motion of the head of the wearer are associated with each other, and hence the switching between the modes can be performed by a more intuitive instruction method.

Second Embodiment

Figure 9:
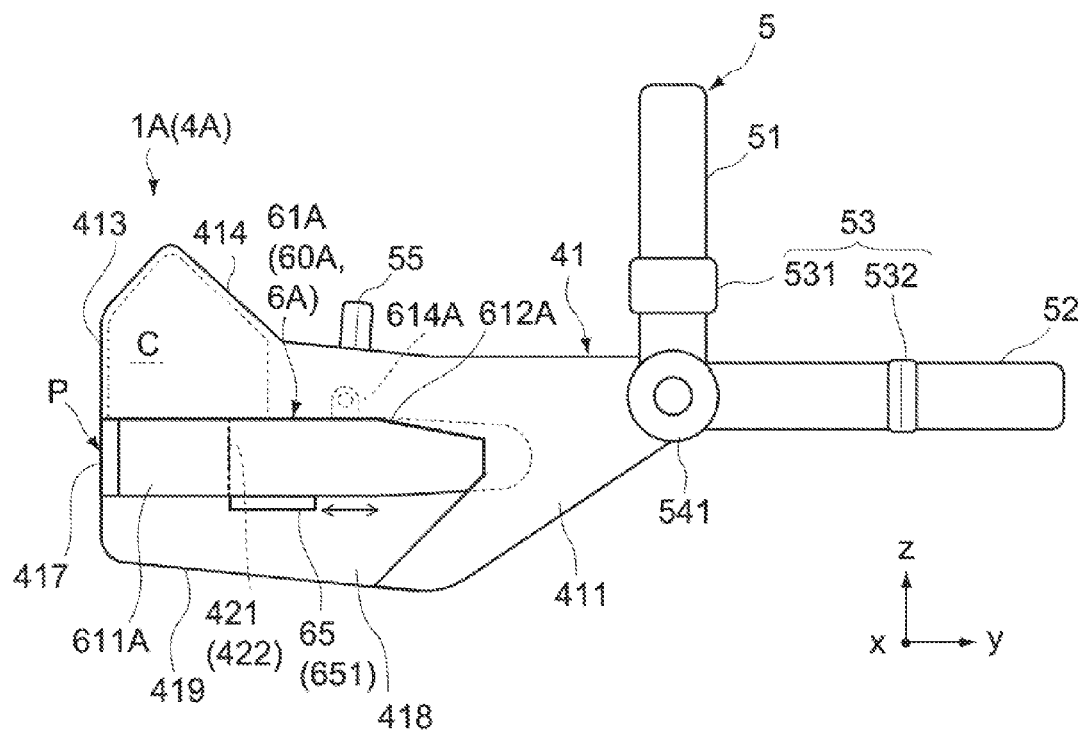
FIG. 9 is a schematic side view showing a head-mounted display according to a second embodiment of the present technology.
Figure 10:
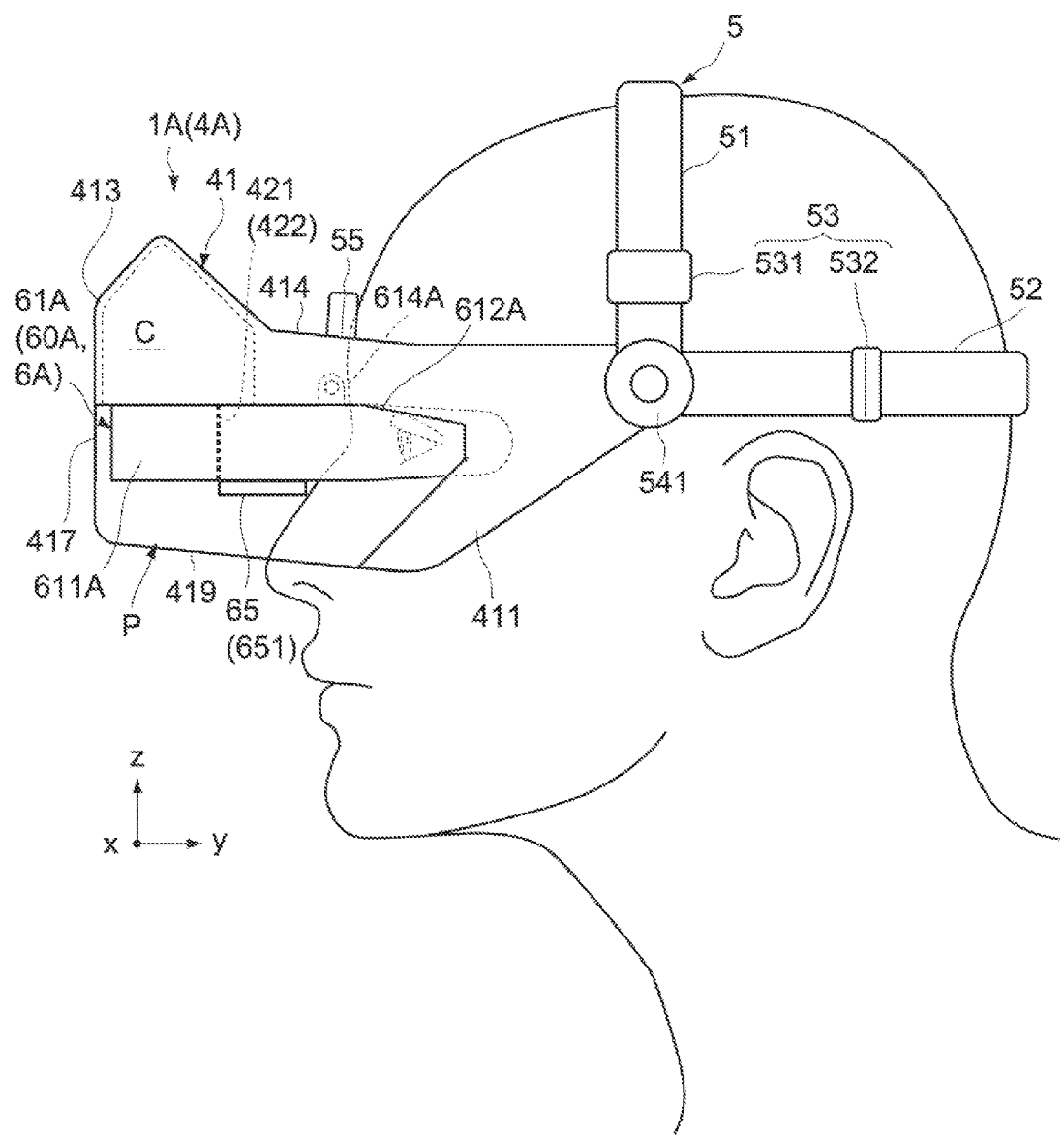
FIG. 10 is a schematic side view showing a state in which the wearer wears the head-mounted display according to the second embodiment of the present technology with the head-mounted display being in a first state.
Figure 11:
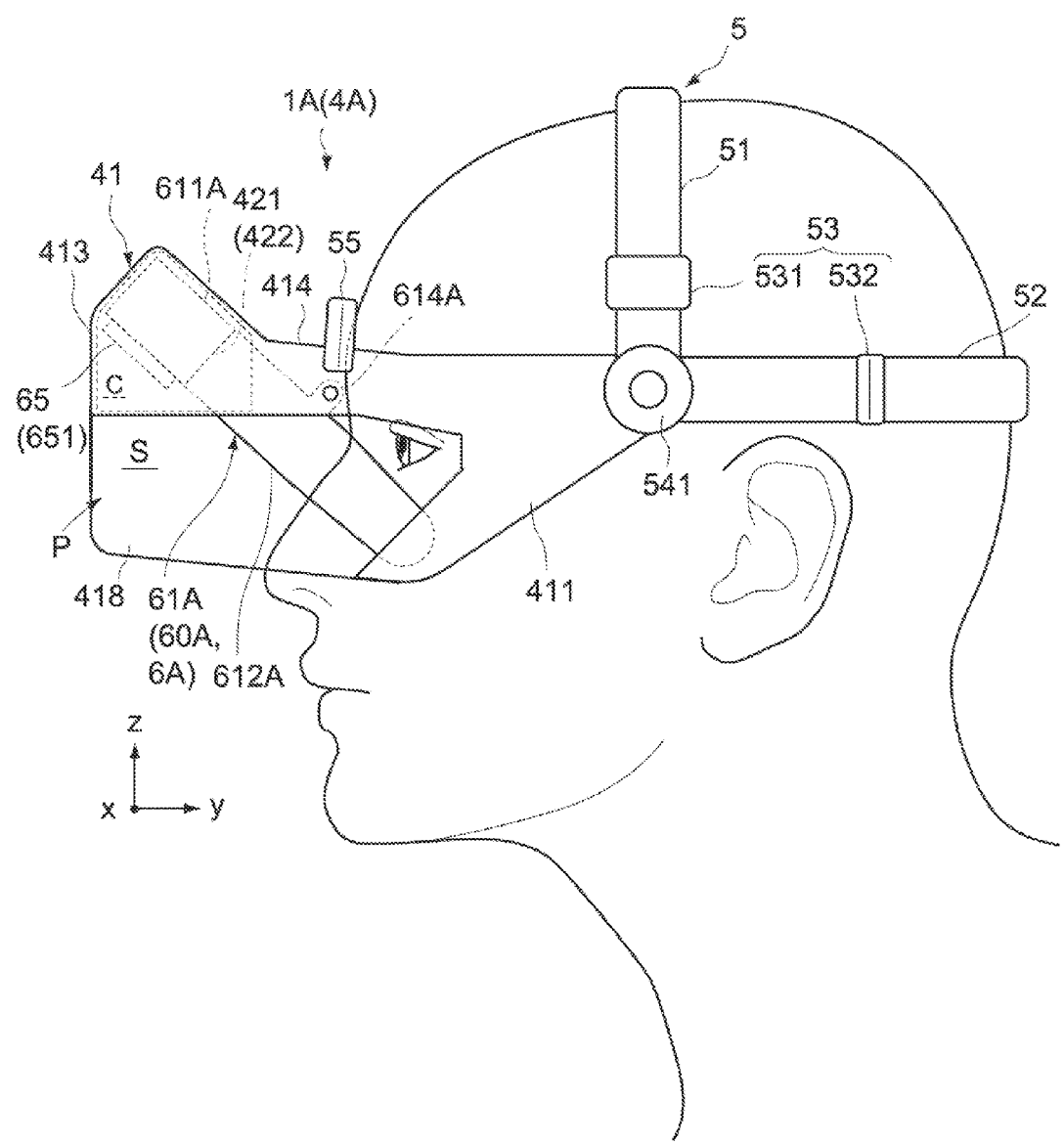
FIG. 11 is a schematic side view showing a state in which the wearer wears the head-mounted display according to the second embodiment of the present technology with the head-mounted display being in a second state.
Figure 12:
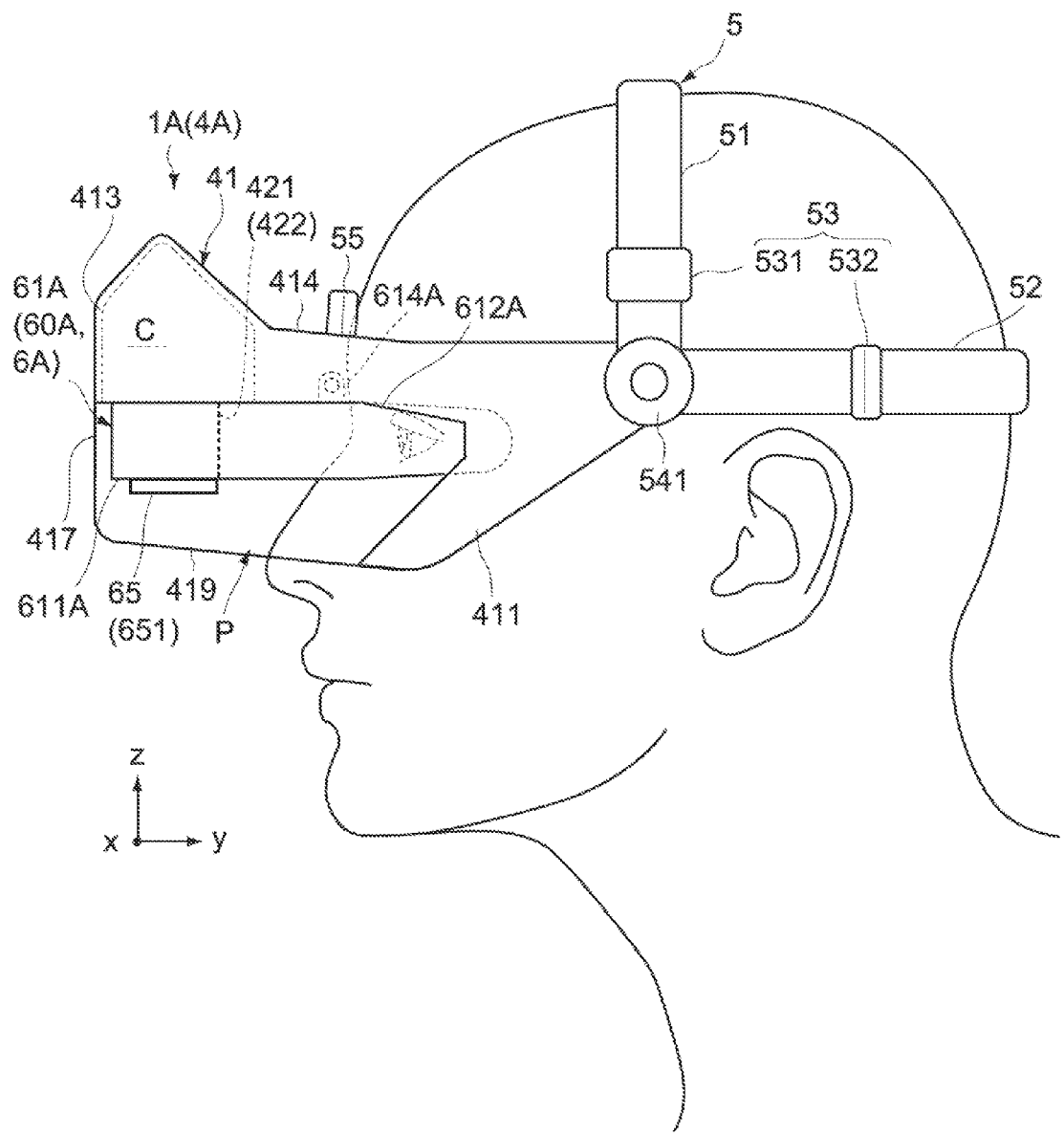
FIG. 12 is a schematic side view showing a state in which the wearer wears the head-mounted display according to the second embodiment of the present technology with the head-mounted display being in a third state.

FIGS. 9 to 13 are views each showing a configuration of an HMD 1A according to a second embodiment of the present technology. FIG. 9 is a schematic side view. FIGS. 10 and 12 are schematic side views each showing a state in which the wearer wears the HMD 1A. Note that, in the figures, parts corresponding to those of the first embodiment described above will be denoted by the same reference signs and detailed descriptions thereof will be omitted.

This embodiment is different from the first embodiment mainly in that the HMD 1A configured to be switchable to a hands-vision-ensuring mode (third state) in addition to the image display mode and the peripheral-vision-ensuring mode. The hands-vision-ensuring mode is configured to provide the wearer with a field of view under the eyes of the wearer. FIGS. 10 to 12 are schematic side views in different states. FIG. 10 shows the image display mode, FIG. 11 shows the peripheral-vision-ensuring mode, and FIG. 12 shows the hands-vision-ensuring mode.

The casing 41 has the same configuration as that of the first embodiment. That is, the casing 41 includes the left and right side surfaces 411 and 412 that are opposed to each other in the x-axis direction, the front surface 413, and the upper surface 414. The casing 41 further includes the opening portions 417, 418, and 419 in which the light-transmitting surface P are provided.

In this embodiment, a switching portion 6A includes a movable member 61A included in an opening and closing mechanism 60A, a detector 62A, a controller 63A, and a storage unit 64A. The switching portion 6A further includes a movable member 65.

In this embodiment, the movable member 65 is provided to the lower part of the movable member 61A. The movable member 65 is configured to be movable between a third position to be located on the lower surface of a movable casing 611A and a fourth position to be located on the lower parts of movable plates 612A and 613A.

In this embodiment, the movable member 65 includes a light-blocking plate 651, and two guide rails, a driving source, and a driving circuit, which are not shown in the figures.

The two guide rails each include an upper rail and a lower rail, and are arranged along the y-axis to be opposed to each other in the x-axis direction. Further, the upper rail extends, for example, from the lower part of each of the movable plates 612A and 613A to the lower surface of the movable casing 611A in the y-axis direction. The lower rails are provided on the light-blocking plate 651 to be opposed to each other in the x-axis direction. The upper rail and the lower rail are engaged to each other and the lower rail slides relative to the upper rail. In this manner, the light-blocking plate 651 is allowed to move. Further, the driving source and the driving circuit (not shown) are connected to the guide rails. The driving source is not particularly limited. An electric motor, a pneumatic cylinder, or the like may be appropriately used. Further, the guide rails may be provided with a well-known locking mechanism or the like so that the position of the light-blocking plate 651 on the guide rails can be fixed.

The light-blocking plate 651 is located between the movable plates 612A and 613A at the third position (see FIG. 10). At this time, a gap formed between the movable plates 612A and 613A is covered and the field of view under the eyes is blocked. In other words, the opening portion 419 is closed.

Meanwhile, the light-blocking plate 651 is retracted onto the lower surface of the movable casing 611A at the fourth position (see FIGS. 11 and 12). At this time, through the gap formed between the movable plates 612A and 613A of the movable member 61A, the field of view under the eyes is provided via the opening portion 419. In other words, the opening portion 419 is opened.

Here, the light-blocking plate 651 is formed to have a rectangular plate shape, for example. The size of the light-blocking plate 651 is not particularly limited. However, the length of the light-blocking plate 651 along the x-axis direction is set to be as long as or longer than a distance between the movable plates 612A and 613A opposed to each other. Further, for example, the length of the light-blocking plate 651 along the y-axis direction is set to be almost as long as a distance between a boundary between the movable casing 611A and the movable plates 612A and 613A and the face of the wearer upon the mounting and to be such a length that the light-blocking plate 651 can be sufficiently retracted onto the lower surface of the movable casing 611A. With this, the field of view under the eyes can be sufficiently blocked when the movable member 65 is moved to the third position, while the field of view under the eyes can be sufficiently provided when the movable member 65 is moved to the fourth position.

Hereinafter, referring to FIGS. 10 to 12, the respective modes according to this embodiment and position relationships between the movable member 61A and the movable member 65 will be described.

In the image display mode (see FIG. 10), the movable member 61A is located at the first position, and hence the display surfaces 421 and 422 present an image to the wearer as in the first embodiment. Meanwhile, the movable member 65 is located at the third position and the opening portion 419 is closed.

Further, in the peripheral-vision-ensuring mode (see FIG. 11), the movable member 61A is located at the second position and the movable member 65 is located at the fourth position, and hence the peripheral vision is ensured via the space S as in the first embodiment.

Further, in the hands-vision-ensuring mode (see FIG. 12), the movable member 61A is located at the first position and the movable member 65 is located at the fourth position, and hence only the opening portion 419 is opened and the field of view under the eyes is provided.

The switching between the modes is performed by the detector 62A and the controller 63A as in the first embodiment. The detector 62A is formed of an angular velocity sensor 62A as in the first embodiment. That is, when the wearer performs the motion of moving the head upward and the motion of moving the head downward, those motions can be each outputted as the signal relating to the angular velocity.

In this embodiment, according to the signal relating to the angular velocity, which is outputted from the angular velocity sensor 62A, the controller 63A performs control to switch the image display mode, the peripheral-vision-ensuring mode, and the hands-vision-ensuring mode to one another.

As in the first embodiment, the controller 63A calculates the angular velocity due to the rotation of the casing 41 about the x-axis. When determining that the angular velocity is equal to or larger than predetermined angular velocity, the controller 63A executes integration processing and further determines whether or not the angle of rotation is equal to or larger than a predetermined angle. With this, when the rotation of the casing 41 about the x-axis is at the predetermined velocity or higher and the predetermined angle or more, the switching between the first position and the second position of the movable member 61A and the switching between the third position and the fourth position of the movable member 65 can be performed.

That is, when a predetermined motion of the head is detected in the image display mode in which the movable member 61A is located at the first position and the movable member 65 is located at the fourth position, it is possible to switch to the hands-vision-ensuring mode in which only the movable member 65 is moved to the third position or the peripheral-vision-ensuring mode in which the movable member 61A is moved to the second position and the movable member 65 is moved to the fourth position.

In addition, the controller 63A may be configured to determine the direction of the rotation. Further, the storage unit 64A may be configured to store determination results after the activation to grasp current positions (modes) of the movable members 61A and 65. With this, when a rotation at an angle equal to or larger than the predetermined angle is detected, it is possible to determine which mode the current mode is to be switched to, based on the current mode and the direction of the rotation.

For example, in the image display mode, when such angular velocity that the front surface 413 side of the casing 41 rotates upward about the x-axis is detected, a signal for moving the movable member 61A from the first position to the second position is outputted to the movable member 61A and a signal for moving the movable member 65 from the fourth position to the third position is outputted to the movable member 65. With this, the mode is switched to the peripheral-vision-ensuring mode. Further, for example, in the image display mode, when the downward rotation of the front surface 413 side is detected, a signal for moving only the movable member 65 from the fourth position to the third position is outputted. With this, the mode is switched to the hands-vision-ensuring mode.

Similarly, in the peripheral-vision-ensuring mode, when the downward rotation of the front surface 413 side is detected, the mode may be switched to the image display mode. Further, in the hands-vision-ensuring mode, when the upward rotation of the front surface 413 side is detected, the mode may be switched to the image display mode.

As described above, in this embodiment, due to the provision of the movable member 65, the opening portion 419 is closed in the image display mode. With this, it is possible to suppress also incident light from the outside from under the eyes, so that a clearer image can be presented.

Further, in the case where it is necessary to also ensure the field of view near the hands while the wearer is observing images, the movement of the movable member 65 can open the opening portion 419 and the mode can be switched to the hands-vision-ensuring mode. With this, even in the case where the external light is blocked in a state in which the wearer wears the HMD 1A, switching to the state in which the field of view near the hands is ensured can be performed depending on the situation.

Further, due to the thus configured controller 63A, the movements of the movable members 61A and 65 and the motions of the head of the wearer are associated with each other. Thus, the switching between the modes can be performed by a more intuitive instruction method.

Third Embodiment

Figure 13:
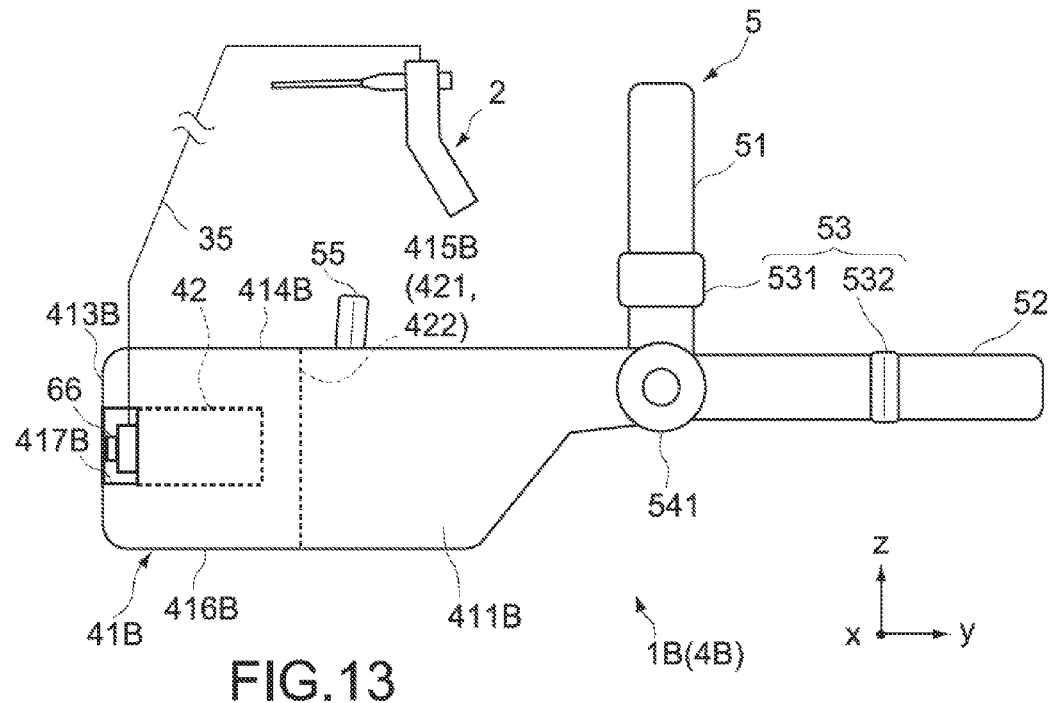
FIG. 13 is a schematic side view showing a state in which the wearer wears a head-mounted display according to a third embodiment of the present technology with the head-mounted display being in a first state.
Figure 14:
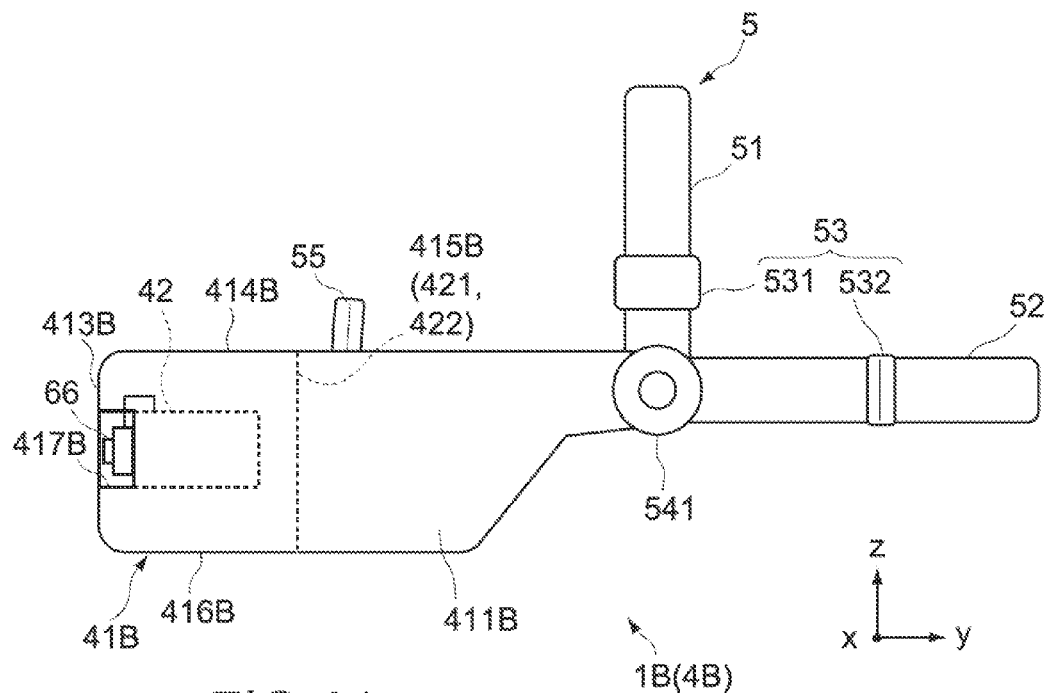
FIG. 14 is a schematic side view showing a state in which the wearer wears the head-mounted display according to the third embodiment of the present technology with the head-mounted display being in a second state.
Figure 15:
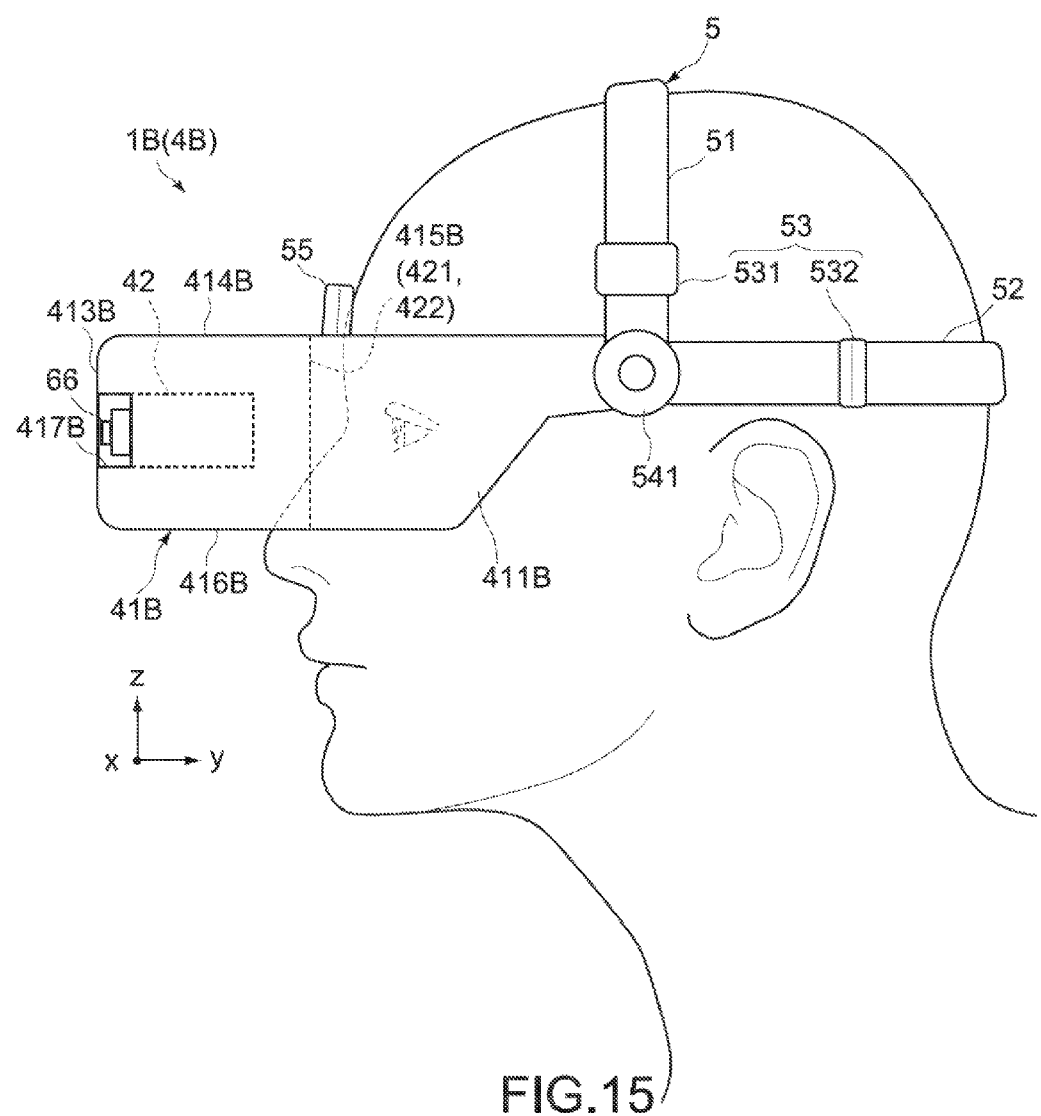
FIG. 15 is a schematic side view showing a state in which the wearer wears the head-mounted display according to the third embodiment of the present technology.
Figure 16:
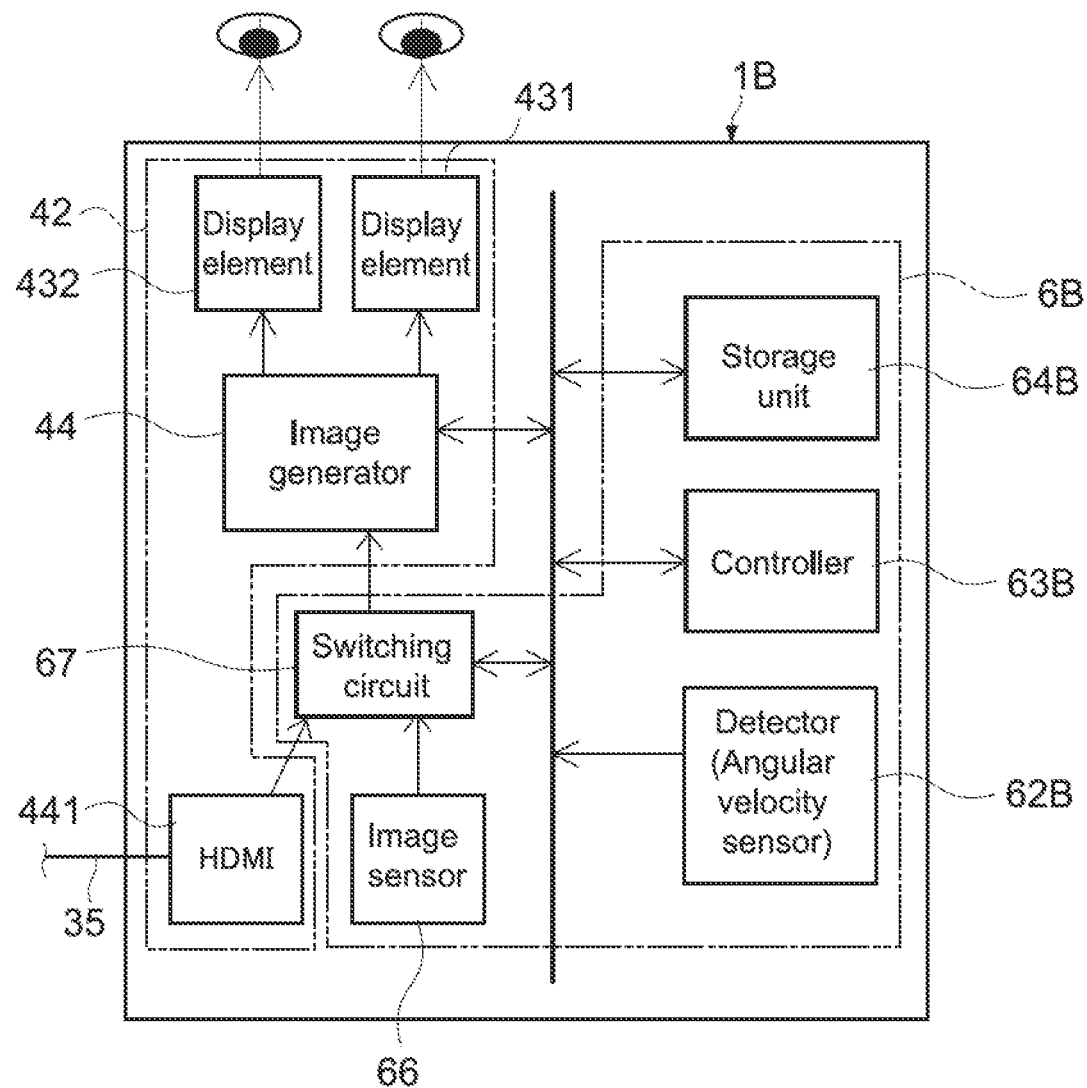
FIG. 16 is a block diagram showing a configuration of the head-mounted display according to the third embodiment of the present technology.

FIGS. 13 to 16 are views each showing a configuration of an HMD 1B according to a third embodiment of the present technology. FIGS. 13 and 14 are schematic side views. FIG. 15 is a schematic side view showing a state in which the wearer wears the HMD 1B. FIG. 16 is a block diagram showing an apparatus configuration of an HMD 1B. Note that, in the figures, parts corresponding to those of the first embodiment described above will be denoted by the same reference signs and detailed descriptions thereof will be omitted.

This embodiment is different from the first embodiment mainly in that a method of switching between the image display mode and the peripheral-vision-ensuring mode is different. That is, a switching portion 6B of the HMD 1B further includes an image sensor 66 for imaging the field of view outside a casing 41B. In the peripheral-vision-ensuring mode, the display surfaces 421 and 422 are configured to present an image captured by the image sensor 66. FIG. 13 shows a state in the image display mode according to this embodiment. FIG. 14 shows a state of the peripheral-vision-ensuring mode.

The casing 41B has a configuration different from that of the first embodiment in that the casing 41B does not include the opening portions. That is, the casing 41B includes left and right side surfaces 411B and 412B that are opposed to each other in the x-axis direction, a front surface 413B and an eye-side surface 415B that are opposed to each other in the y-axis direction, and an upper surface 414B and a lower surface 416B that are opposed to each other in the z-axis direction.

The eye-side surface 415B is configured to be opposed to the left and right eyes of the wearer in front of and in proximity to the left and right eyes. For example, in the center of the eye-side surface 415B, a cutout may be formed corresponding to the nose shape of the wearer. Meanwhile, the front surface 413B is provided in front of the wearer wearing the HMD 1B and is formed to have a rectangular shape, for example. Further, in this embodiment, a housing portion 417B in which the image sensor 66 of the switching portion 6B is provided is formed in the front surface 413B.

Further, in this embodiment, the display surfaces 421 and 422 are arranged in the eye-side surface 415B along the x-axis direction. The image generator 44 and the left and right display elements 431 and 432 of the image display unit 42 are provided inside the casing 41B.

The display surfaces 421 and 422 are configured to be capable of switching between two types of images of an endoscopic image and an image of the outside of the casing 41B through the switching portion 6B according to this embodiment and displaying that image. The endoscopic image is inputted from the processor unit 3. The image of the outside of the casing 41B is captured by the image sensor 66. Specifically, the endoscopic image acquired by the HDMI input terminal 441 is displayed by the display surfaces 421 and 422 (see FIG. 13). Further, in the peripheral-vision-ensuring mode, the image of the outside of the casing 41B, which is captured by the image sensor 66 in the image display mode, is displayed by the display surfaces 421 and 422 (see FIG. 14).

FIG. 16 is a block diagram showing an apparatus configuration of the HMD 1B. The switching portion 6B includes the image sensor 66, a detector 62B, a controller 63B, a storage unit 64B, and a switching circuit 67.

The image sensor 66 is provided to the housing portion 417B formed in the front surface 413B. The image sensor 66 is configured to be capable of mainly imaging a field of view in front of the casing 41B. The configuration of the image sensor 66 is not particularly limited. For example, an image sensor such as a CMOS (complementary metal-oxide semiconductor) image sensor is used. Image data captured by the image sensor 66 is inputted into the switching circuit 67.

Into the switching circuit 67, for example, endoscopic image data acquired by the HDMI input terminal 441 and peripheral-image data captured by the image sensor 66 are inputted. In addition, based on the output from the controller 63B, the switching circuit 67 is configured to input either one of those pieces of image data into the image generator 44.

The detector 62B is formed of an angular velocity sensor 62B as in the first embodiment. That is, when the wearer performs the motion of moving the head upward and the motion of moving the head downward, those motions can be each outputted as the signal relating to the angular velocity.

According to the signal relating to the angular velocity, which is outputted from the angular velocity sensor 62B, the controller 63B performs control to switch between the image display mode and the peripheral-vision-ensuring mode when the rotation of the casing 41B about the x-axis is at the predetermined velocity or higher and the predetermined angle or more. That is, based on the output from the angular velocity sensor 62B, the controller 63B outputs, to the switching circuit 67, a signal for changing the image data to be inputted into the image generator 44.

With the thus configured HMD 1B, as in the first embodiment, the switching between the image display mode in which the endoscopic image is presented and the peripheral-vision-ensuring mode in which the peripheral vision is provided can be performed. With this, the switching between the modes can be performed without touching the HMD 1B. Further, the HMD 1B can be configured without the driving source and the like. Thus, the apparatus configuration can be simplified.

Fourth Embodiment

Figure 17:
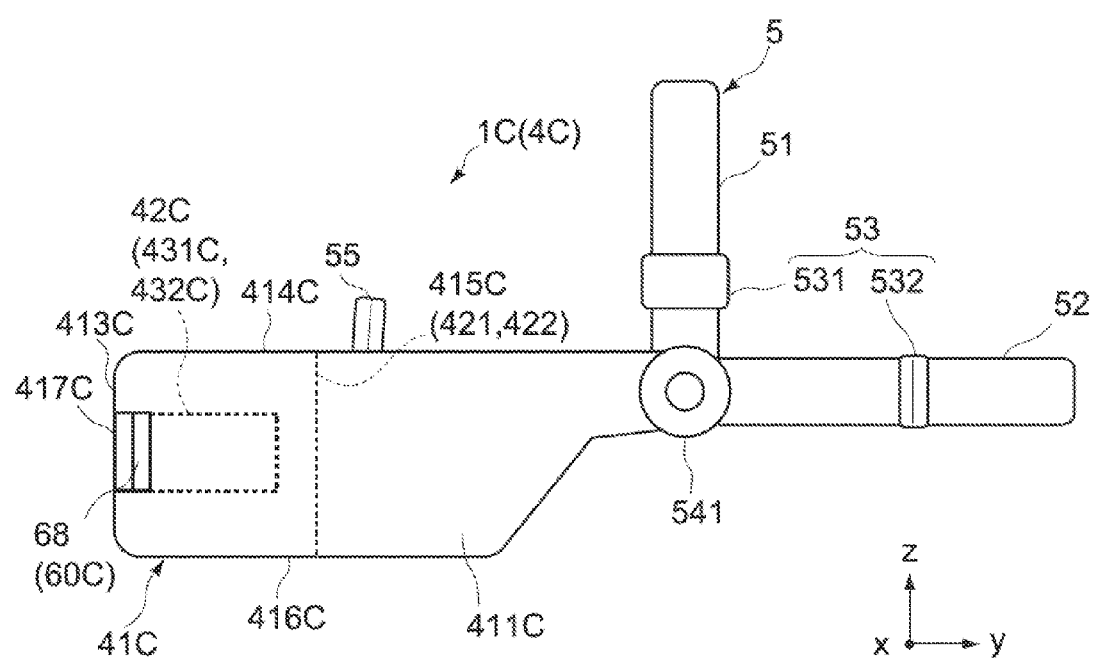
FIG. 17 is a schematic side view showing a head-mounted display according to a fourth embodiment of the present technology.

FIG. 17 is a schematic side view showing a configuration of an HMD 1C according to a fourth embodiment of the present technology. Note that, in the figures, parts corresponding to those of the first embodiment described above will be denoted by the same reference signs and detailed descriptions thereof will be omitted.

This embodiment is different from the first embodiment mainly in that only an opening portion (first opening portion) 417C is provided in a front surface 413C of a casing 41C and a shutter member 68 included in an opening and closing mechanism 60C is provided in the opening portion 417C. In addition, display elements 431C and 432C are formed of see-through display elements. Switching the shutter member 68 between the light-transmitting state and the light-blocking state can perform the switching between the image display mode and the peripheral-vision-ensuring mode.

The casing 41C according to this embodiment has, as a whole, the same configuration as that of the casing 41B according to the third embodiment. That is, the casing 41C includes left and right side surfaces 411C and 412C that are opposed to each other in the x-axis direction, the front surface 413C and an eye-side surface 415C that are opposed to each other in the y-axis direction, and an upper surface 414C and a lower surface 416C that are opposed to each other in the z-axis direction. The eye-side surface 415C is configured to be opposed to the left and right eyes of the wearer in front of and in proximity to the left and right eyes. For example, in the center of the eye-side surface 415C, a cutout may be formed corresponding to the nose shape of the wearer.

Meanwhile, the opening portion 417C is formed in the front surface 413C. Further, the size of the opening portion 417C is not particularly limited as long as the field of view in front of the wearer can be sufficiently ensured in the peripheral-vision-ensuring mode. In addition, the shutter member 68 may be provided in the opening portion 417C. A light-transmitting plastic plate, a light-transmitting glass plate, or the like may be provided in the outside thereof.

In this embodiment, the shutter member 68 is formed of a liquid crystal shutter capable of electrically controlling light. Specifically, a voltage to be applied by a driving circuit (not shown) is controlled, to thereby control the amount of light to transmit therethrough. In this manner, the switching between the light-transmitting state and the light-blocking state is performed and the opening portion 417C is configured to be capable of opening and closing. Driving of the driving circuit of the shutter member 68 is controlled by the controller 63 as will be described later.

In this embodiment, within the casing 41C, the shutter member 68, an image display unit 42C including the display elements 431C and 432C, and the display surfaces 421 and 422 are arranged from the opening portion 417C side along the y-axis direction. In this embodiment, the display elements 431C and 432C are formed of transparent organic EL elements. Such display elements 431C and 432C can be manufactured by, for example, forming electrode layers constituting the elements using transparent conductive films of ITO (tin-doped indium oxide) or the like.

In this embodiment, in the image display mode, the shutter member 68 is controlled to be in the light-blocking state and the opening portion 417C is closed. With this, the external light does not enter through the opening portion 417C, so that a clearer image can be presented by the display surfaces 421 and 422.

Meanwhile, in the peripheral-vision-ensuring mode, the shutter member 68 is controlled to be in the light-transmitting state and the opening portion 417C is opened. With this, the external light enters through the opening portion 417C, and hence the field of view in front of the wearer is provided.

As in the first embodiment, the detector 62 is formed of the angular velocity sensor 62. That is, when the wearer performs the motion of moving the head upward and the motion of moving the head downward, those motions can be each outputted as the signal relating to the angular velocity.

According to the signal relating to the angular velocity, which is outputted from the angular velocity sensor 62, the controller 63 performs control to switch between the image display mode and the peripheral-vision-ensuring mode when the rotation of the casing 41 about the x-axis is at the predetermined velocity or higher and the predetermined angle or more. Specifically, in the image display mode, by controlling the driving circuit of the shutter member 68 to apply a lower voltage on the shutter member 68, the light-blocking state is set. Meanwhile, in the peripheral-vision-ensuring mode, by controlling the driving circuit of the shutter member 68 to apply a higher voltage on the shutter member 68 than that in the light-blocking state, the light-transmitting state is set.

Also in the thus configured HMD 1C, as in the first embodiment, the switching between the image display mode in which the endoscopic image is presented and the peripheral-vision-ensuring mode in which the peripheral vision is provided can be performed. With this, the switching between the modes can be performed with a simple apparatus configuration without touching the HMD 1C.

Fifth Embodiment

Figure 18:
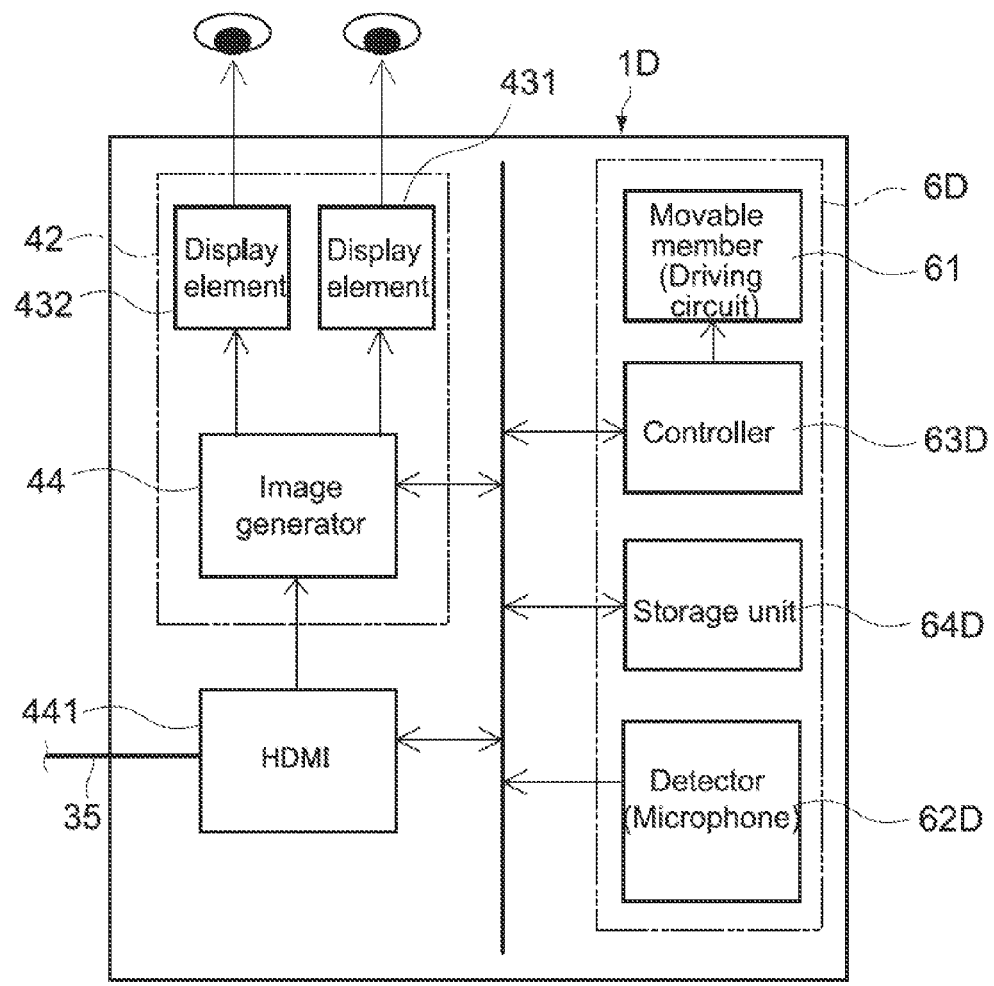
FIG. 18 is a block diagram showing a configuration of a head-mounted display according to a fifth embodiment of the present technology.

FIG. 18 is a block diagram showing an apparatus configuration of an HMD 1D according to a fifth embodiment of the present technology. This embodiment is different from the first embodiment mainly in that audio information is used as the information on the motion of the wearer and a microphone 62D is provided as a detector 62D. Note that, in the figures, parts corresponding to those of the first embodiment described above will be denoted by the same reference signs and detailed descriptions thereof will be omitted.

The microphone 62D is provided to the casing 41. The microphone 62D is configured to be capable of acquiring the audio information of the wearer as an electrical audio signal. The configuration of the microphone 62D is not particularly limited. Any configuration may be appropriately used depending on the apparatus configuration of the HMD 1D.

A controller 63D switches between the image display mode and the peripheral-vision-ensuring mode based on the acquired audio signal. Specifically, the controller 63D recognizes an audio from the audio signal and outputs a signal for switching between the modes when the resulting audio is a predetermined audio. The audio recognition method is not particularly limited. For example, a statistic method or the like may be used.

For example, as an exemplary configuration, an audio signal of "OPEN" is recognized in the image display mode, switching to the peripheral-vision-ensuring mode may be carried out. Further, an audio signal of "CLOSE" is recognized in the peripheral-vision-ensuring mode, switching to the image display mode may be carried out.

Also in the thus configured HMD 1D, as in the first embodiment, it is possible to switch the image display mode in which the endoscopic image is presented and the peripheral-vision-ensuring mode in which the peripheral vision is provided. Further, even in the case where the motion of the wearer is limited, only making a sound can perform the switching between the modes. Thus, the switching can be more easily performed.

Sixth Embodiment

Figure 19:
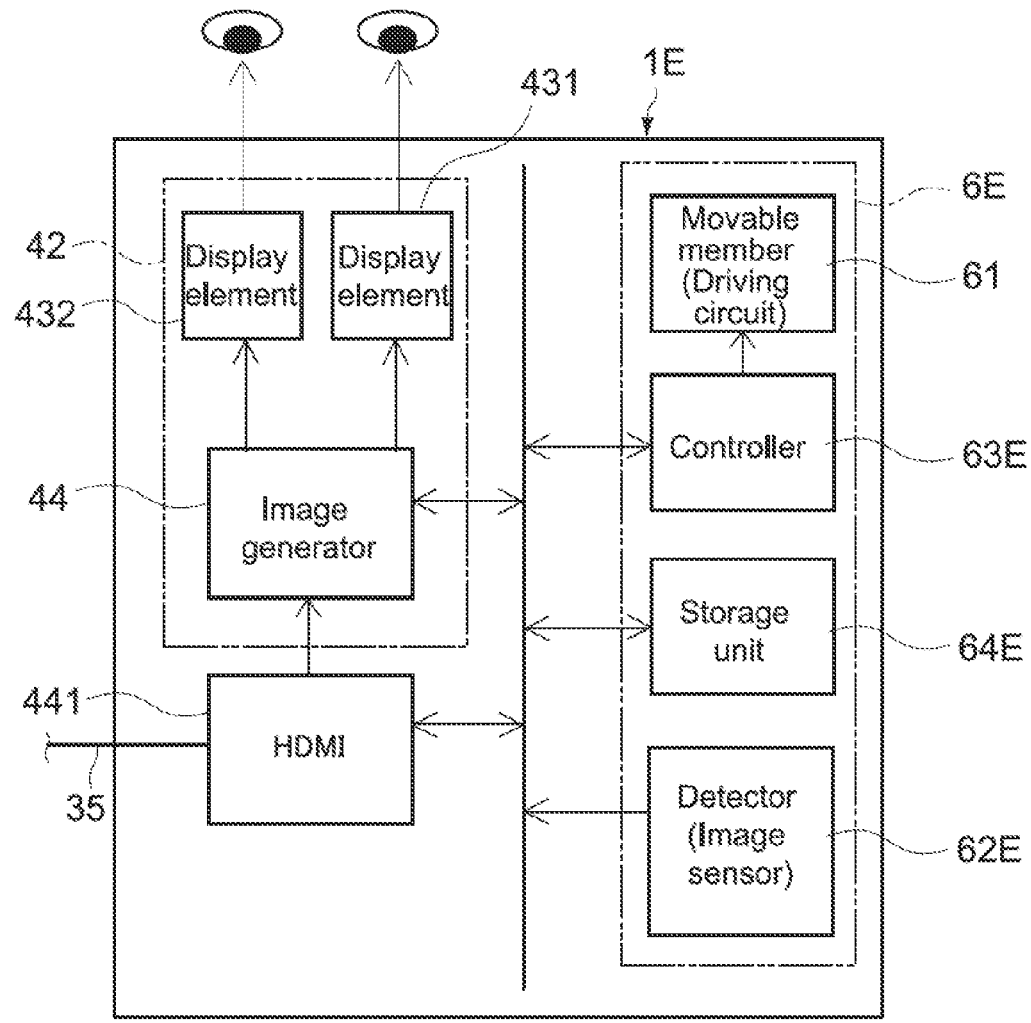
FIG. 19 is a block diagram showing a configuration of a head-mounted display according to a sixth embodiment of the present technology.

FIG. 19 is a block diagram showing an apparatus configuration of an HMD 1E according to a sixth embodiment of the present technology. This embodiment is different from the first embodiment mainly in that information on the line of sight of the wearer is used as the information relating to the motion of the wearer and an image sensor 62E is provided as a detector 62E. Note that, in the figures, parts corresponding to those of the first embodiment described above will be denoted by the same reference signs and detailed descriptions thereof will be omitted.

The image sensor 62E is provided near the space S within the casing 41, for example. The image sensor 62E is configured to be capable of imaging an eye (pupil) of the wearer. With this, based on the captured image data, the line of sight of the wearer can be detected. Note that, the configuration of the image sensor 62E is not particularly limited. A CMOS image sensor or the like may be appropriately used.

Based on the acquired information on the line of sight of the wearer, a controller 63E switches between the image display mode and the peripheral-vision-ensuring mode. Specifically, based on the acquired image data, the controller 63E tracks a movement of the line of sight of the wearer, that is, a motion of the pupil. For example, when it is determined that the pupil moves upward by a predetermined distance or more in the image display mode, it is recognized that the line of sight moves upward and the mode is switched to the peripheral-vision-ensuring mode. Meanwhile, when it is determined that the pupil moves downward by the predetermined distance or more in the peripheral-vision-ensuring mode, it is recognized that the line of sight moves downward and the mode is switched to the image display mode.

Also in the thus configured HMD 1E, as in the first embodiment, the switching between the image display mode in which the endoscopic image is presented and the peripheral-vision-ensuring mode in which the peripheral vision is provided can be performed. Further, even in the case where the motion of the wearer is limited, the switching between the modes can be performed without touching the HMD 1E.

Although the embodiments of the present technology are described above, the present technology is not limited thereto and various modifications can be made based on the technical concept of the present technology.

Although, in the above-mentioned embodiments, the upward or downward movement is used as the motion of the head of the wearer, the motion of the head of the wearer is not limited thereto as long as it is a motion that can be detected by the detector. For example, a motion of tilting the head to the side or other motions may be appropriately used.

Although, in the above-mentioned embodiments, although the angular velocity sensor is used as the detector capable of detecting the motion of the head of the wearer, the detector is not limited thereto. For example, an acceleration sensor may be used. Also with this, it is possible to detect a tilt of the casing about the x-axis to detect the motion of the head of the wearer. In addition, if the angular velocity sensor and the acceleration sensor are both provided, it is possible to calculate the angle of rotation at higher accuracy. Further, an orientation sensor or the like may be used.

Further, although, in the first embodiment, the casing 41 includes the opening portion 419 for providing the field of view under the eyes of the wearer, the present technology is not limited thereto. The casing 41 does not need to include the opening portion 419. With this, in the image display mode, it is possible to also suppress incident light from the outside from below, so that a clearer image can be presented.

In the third embodiment, for example, another image sensor provided under the eyes of the wearer, that is, facing the lower part of the casing 41B may be further provided. With this, as in the second embodiment, the hands-vision-ensuring mode can also be provided.

Further, although, in the third embodiment, the single image sensor 66 is provided, two image sensors 66 may be provided corresponding to the left and right eyes. With this, it is possible to display images of the left and right image sensors to present the peripheral vision image also as a 3D image.

In addition, also in the fifth and sixth embodiments, the main body having the same configuration as that of the second embodiment may be used so that the hands-vision-ensuring mode can also be provided.

Although, in the fourth embodiment, the shutter member 68 is formed of the liquid crystal shutter, another configuration capable of switching between the light-transmitting state and the light-blocking state may be employed. For example, as the shutter mechanism, a light-blocking plate or the like capable of opening and closing the opening portion 417C may be used.

Although, in the fourth embodiment, the display elements 431 and 432 are formed of the transparent organic EL elements, the present technology is not limited thereto. For example, the display elements 431 and 432, which are not limited to be transparent, and a plurality of half mirrors may be provided as the display elements 431 and 432 and the optical systems of the image display unit 43.

The half mirrors are each configured to allow light in one direction to transmit therethrough and reflect light in the other direction. That is, if two half mirrors are arranged inside the opening portion 417C and display elements are provided above or below the half mirrors, external light transmits through the half mirrors and image light is reflected by the half mirrors to the wearer. With this, by putting the shutter member 68 in the light-transmitting state, the external light can enter through the opening portion 417C, so that the peripheral-vision-ensuring mode can be set. Further, by putting the shutter member 68 in the light-blocking state, the image light from the display elements can be guided to the wearer, so that the image display mode can be set.

As a modified example of the sixth embodiment, the following configuration may be employed. For example, information on a wink may be used as the information on the motion of the wearer, using the image sensor 62E. Based on such information, the switching between the image display mode and the peripheral-vision-ensuring mode may be performed. The controller 63E detects a wink of the wearer based on the acquired image data. For example, when it is determined that two winks are performed in a predetermined period of time in the image display mode, the mode is switched to the peripheral-vision-ensuring mode. Meanwhile, for example, when it is determined that three winks are performed in the predetermined period of time in the peripheral-vision-ensuring mode, the mode is switched to the image display mode. Further, by determining a period of time when the wearer closes the eyes, the switching between the modes may be performed.

Although, in the above-mentioned embodiments, the first movable member includes the movable shaft and moves between the first and second positions by being rotated about the movable shaft, the present technology is not limited thereto. For example, the movement between the first and second positions may be a parallel movement in the upper and lower directions. That is, at the second position, the movable member 61 retracting upward or downward from the space S can ensure the field of view of the wearer.

It should be noted that the present technology may also be configured as follows.

(1) A head-mounted display, including a casing having an opening portion; and a movable member movable between a first position in which the movable member covers the opening portion, and a second position in which the movable member does not cover the opening portion.

(2) The head-mounted display according to (1), wherein the opening portion includes a first opening portion and a second opening portion.

(3) The head-mounted display according to (1), further including an other opening portion, and wherein the movable member does not cover the other opening portion in either of the first position and the second position.

(4) The head-mounted display according to (1), further including a detector to detect an indication of an intended mode for the head mounted display, and wherein the movable member moves into one of the first position and the second position in response to the indication detected by the detector (5) The head-mounted display according to (4), wherein the detector is operable to acquire information about motion of a wearer of the head-mounted display, and the head-mounted display is operable to move the movable member in response to the information acquired by the detector.

(6) The head-mounted display according to (5), wherein the motion of the wearer includes head movement.

(7) The head-mounted display according to (5), wherein the motion of the wearer includes eye movement.

(8) The head-mounted display according to (4), wherein the detector is operable to acquire sound information from a wearer of the head-mounted display.

(9) The head-mounted display according to (4), wherein the detector is operable to acquire biological information concerning a wearer of the head-mounted display.

(10) The head-mounted display according to (4), wherein the movable member moves into the first position when the indication indicates that the intended mode is an image display mode, and the movable member moves into the second position when the indication indicates that the intended mode is a peripheral-vision-ensuring mode.

(11) The head-mounted display according to (4), wherein the detector includes an angular velocity sensor.

(12) The head-mounted display according to (4), wherein the detector includes an acceleration sensor.

(13) The head-mounted display according to (4), wherein the detector includes a microphone.

(14) The head-mounted display according to (4), wherein the detector is operable to detect an angular velocity of the casing and determine an angle of rotation of the casing, and wherein the movable member is switched between the first position and the second position when (i) the detected angular velocity is equal to or larger than a predetermined angular velocity and (ii) the determined angle of rotation is equal to or larger than a predetermined angle.

(15) The head-mounted display according to (4), further including a second movable member movable between a third position and a fourth position, wherein the casing further includes an other opening portion, the second movable member moves into one of the third position and the fourth position in response to the indication detected by the detector, the second movable member covers the other opening portion when the second movable member is in the third position and the movable member is in the first position, and the second movable member does not cover the third opening portion when the second movable member is in the fourth position and the movable member is in the first position.

(16) The head-mounted display according to (15), wherein the second movable member moves into the third position when the indication indicates that the intended mode is an image display mode, the second movable member moves into the fourth position when the indication indicates that the intended mode is either of a peripheral-vision-ensuring mode and a hands-vision-ensuring mode.

(17) The head-mounted display according to (15), wherein the detector is operable to detect an angular velocity of the casing and determine an angle of rotation of the casing, and wherein the second movable member is switched between the third position and the fourth position when (i) the detected angular velocity is equal to or larger than a predetermined angular velocity and (ii) the determined angle of rotation is equal to or larger than a predetermined angle.

(18) The head-mounted display according to (15), wherein the detector includes an angular velocity sensor.

(19) The head-mounted display according to (15), wherein the detector includes an acceleration sensor.

(20) The head-mounted display according to (15), wherein the detector includes a microphone.

(21) The head mounted display according to (4), wherein the detector is a line of sight detector.

(22) A medical system, including a head-mounted display, wherein the head mounted display includes a casing having an opening portion; and a movable member movable between a first position in which the movable member covers the opening portion, and a second position in which the movable member does not cover the opening portion.

(23) A head-mounted display, including a casing having an opening portion; and a shutter switchable between a light-transmitting state for selectively transmitting light incident on the opening portion, and a light-blocking state for blocking light incident on the opening portion.

(24) The head-mounted display according to (23), further including a detector to detect an indication of an intended mode for the head mounted display, and wherein the shutter switches between the light-transmitting state and the light-blocking state in response to the indication detected by the detector.

(25) The head-mounted display according to (24), wherein the detector is operable to detect an angular velocity of the casing and determine an angle of rotation of the casing, and wherein the shutter is switched between the light-transmitting state and the light-blocking state when (i) the detected angular velocity is equal to or larger than a predetermined angular velocity and (ii) the determined angle of rotation is equal to or larger than a predetermined angle.

(26) The head-mounted display according to (23), wherein the shutter includes a liquid crystal shutter.

(27) A head-mounted display, including:
a main body including
a casing,
a display surface for presenting an image to a wearer, and
a mounting portion configured to be mounted on a head of the wearer; and
a switching portion that is provided to the main body to switch between a first state in which the display surface presents the image to the wearer and a second state in which the wearer is provided with a field of view outside the casing.

(28) The head-mounted display according to (27), in which
the casing includes a first opening portion, and
the switching portion includes an opening and closing mechanism configured to be capable of opening and closing the first opening portion.

(29) The head-mounted display according to (28), in which
the opening and closing mechanism includes a first movable member that has a first area for supporting the display surface and is configured to be movable between a first position for closing the first opening portion by the first area in the first state and a second position for opening the first opening portion in the second state.

(30) The head-mounted display according to (29), in which
the display surface is configured to emit image light in a first axis direction,
the casing further includes second opening portions that are formed to be opposed to each other in a second axis direction orthogonal to the first axis direction, and
the first movable member further has second areas for closing the second opening portions at the first position.

(31) The head-mounted display according to (27), in which
the switching portion further includes an image sensor for imaging the field of view outside the casing and is configured to present through the display surface an image captured by the image sensor in the second state.

(32) The head-mounted display according to any one of (27) to (31), in which
the switching portion includes a detector that is provided to the main body to be capable of acquiring information on a motion of the wearer and is configured to switch between the first state and the second state based on the information.

(33) The head-mounted display according to (6), in which
the detector is configured to detect a signal relating to angular velocity of the main body that corresponds to a motion of the head of the wearer, and
the switching portion is configured to switch between the first state and the second state according to the signal relating to the angular velocity.

(34) The head-mounted display according to any one of (27) to (33), in which
the switching portion is configured to switch a third state for providing the wearer with a field of view under eyes of the wearer, the first state, and the second state to one another.

(35) The head-mounted display according to (34), in which
the casing includes a third opening portion for presenting the field of view under the eyes of the wearer, and the switching portion includes a second movable member configured to open and close the third opening portion.

(36) The head-mounted display according to (35), in which the second movable member is configured to be movable between a third position for closing the third opening portion in the first state and a fourth position for opening the second opening portions in the second and third states.

It should be understood by those skilled in the art that various modifications, combinations, sub-combinations and alterations may occur depending on design requirements and other factors insofar as they are within the scope of the appended claims or the equivalents thereof.

What is claimed is:

1. A head-mounted display, comprising: a casing having an opening portion; a detector to detect an indication of an intended mode for the head mounted display; a movable member movable between a first position in which the movable member covers the opening portion, and a second position in which the movable member does not cover the opening portion; and a second movable member movable between a third position and a fourth position, the casing having a front surface, a right surface, a left surface, and an upper surface, in which when the head-mounted display is worn by a wearer the front surface is opposite both eyes of the wearer, the upper surface is above the both eyes of the wearer, the right surface is on a side of a right eye of the wearer, and the left surface is on a side of a left eye of the wearer, and when the head-mounted display is worn by the wearer and when the movable member is in the first position, the casing covers the both eyes of the wearer as viewed from in front of the wearer, from a right side of the wearer, from a left side of the wearer, and from above the wearer, wherein the movable member moves into one of the first position and the second position in response to the indication detected by the detector, and wherein the casing further comprises an other opening portion, the second movable member moves into one of the third position and the fourth position in response to the indication detected by the detector, the second movable member covers the other opening portion when the second movable member is in the third position and the movable member is in the first position, and the second movable member does not cover the third opening portion when the second movable member is in the fourth position and the movable member is in the first position.

2. The head-mounted display as recited in claim 1, wherein the detector is operable to acquire sound information from the wearer of the head-mounted display.

3. The head-mounted display as recited in claim 1, wherein the detector is operable to acquire biological information concerning from the wearer of the head-mounted display.

4. The head-mounted display as recited in claim 1, wherein the detector comprises an angular velocity sensor.

5. The head-mounted display as recited in claim 1, wherein the detector comprises an acceleration sensor.

6. The head-mounted display as recited in claim 1, further comprising a connection device to connect the head-mounted display to an external device to receive endoscopic images.

7. The head-mounted display as recited in claim 6, in which the external device includes a processing device which is connectable to an endoscope apparatus configured to capture the endoscopic images.

* * * * *